(12) United States Patent
Rastegar

(10) Patent No.: US 11,693,022 B2
(45) Date of Patent: Jul. 4, 2023

(54) HIGH-G AND HIGH-PRECISION PIEZOELECTRIC-BASED LINEAR ACCELEROMETERS

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 390 days.

(21) Appl. No.: 16/181,036

(22) Filed: Nov. 5, 2018

(65) Prior Publication Data

US 2019/0137538 A1 May 9, 2019

Related U.S. Application Data

(60) Provisional application No. 62/581,682, filed on Nov. 4, 2017.

(51) Int. Cl.
*G01P 15/09* (2006.01)
*G01P 1/02* (2006.01)

(52) U.S. Cl.
CPC ...... *G01P 15/0907* (2013.01); *G01P 15/0915* (2013.01)

(58) Field of Classification Search
CPC .............. G01P 15/0907; G01P 2015/0805
See application file for complete search history.

(56) References Cited

U.S. PATENT DOCUMENTS

| 4,221,131 A * | 9/1980 | Albert ................. G01P 15/0802 73/514.29 |
| 4,225,802 A * | 9/1980 | Suzuki .................. G01L 23/222 310/321 |
| 2010/0236329 A1* | 9/2010 | Rastegar .................. H02N 2/18 73/514.34 |
| 2010/0236440 A1* | 9/2010 | Rastegar ............... F42C 11/008 102/209 |
| 2011/0204751 A1* | 8/2011 | Rastegar ................ H02N 2/186 310/339 |
| 2020/0174034 A1* | 6/2020 | Nie ......................... G01P 15/18 |

FOREIGN PATENT DOCUMENTS

GB        2033584 A *  5/1980   .......... G01P 15/0907

* cited by examiner

*Primary Examiner* — Jill E Culler
*Assistant Examiner* — Ruben C Parco, Jr.

(57) ABSTRACT

An accelerometer including: a housing having an internal cavity; a piezoelectric material disposed in the internal cavity; a mass movable disposed in the internal cavity; and a spring disposed between the piezoelectric material and a portion of the housing, the spring being compressively preloaded against the piezoelectric material; wherein the mass is movable when the housing experiences an acceleration such that the mass acts upon the spring and the spring acts against the piezoelectric material, the piezoelectric material outputting a signal corresponding to a magnitude of the acceleration.

20 Claims, 14 Drawing Sheets

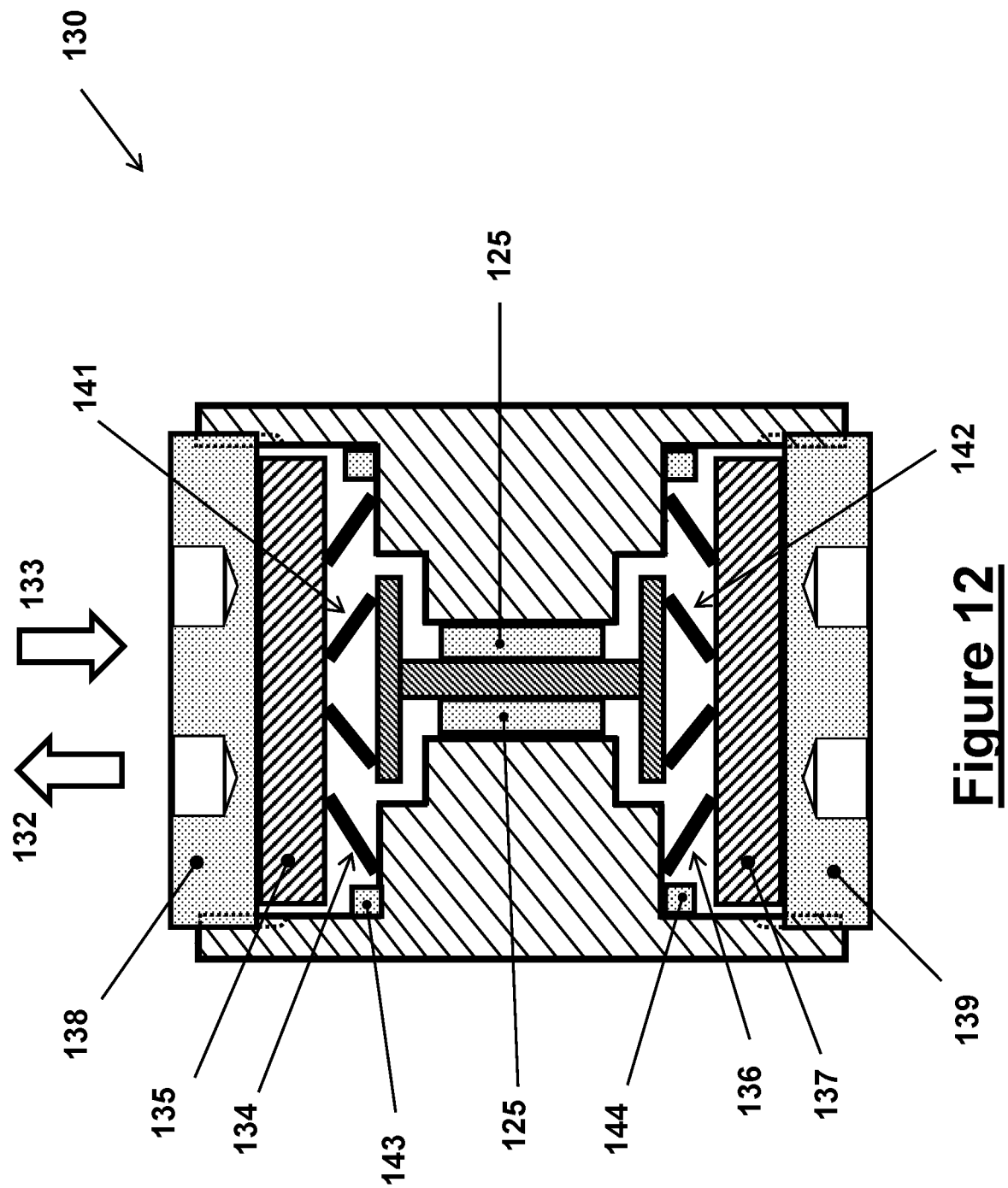

HIGH-G AND HIGH-PRECISION PIEZOELECTRIC-BASED LINEAR ACCELEROMETERS

CROSS-REFERENCE TO RELATED APPLICATION

This application claims benefit to U.S. Provisional Patent Application No. 62/581,682 filed on Nov. 4, 2017, the entire contents of which is incorporated herein by reference.

BACKGROUND

1. Field

The present disclosure relates generally to accelerometers and more particularly to those employing piezoelectric elements and methods for their design for generating an electrical output in accordance with an acceleration to which the accelerometer is subjected, and even more particularly to accelerometers employing piezoelectric elements for accurately measuring high linear and rotary accelerations, such as those experienced in munitions during firing and hard objects impacting hard surfaces at high speeds

2. Prior Art

When measuring mechanical vibrations or acceleration, so-called seismic accelerometers employing piezoelectric material for generating the electrical charges are often used. In such accelerometers, seismic mass(es) and piezoelectric element(s) are arranged such that when the accelerometer is subjected to acceleration, the resulting inertial forces introduce strain in the piezoelectric element(s), which in turn produce electrical outputs by virtue of the piezoelectric effect.

Examples of piezoelectric accelerometer types are accelerometers of the compression type, accelerometers of the "Ring shear" type, accelerometers of the "Conical ring shear" type, accelerometers of the "Delta Shear" type and accelerometers of the "Planar Shear" type.

When vibrations having a frequency which is substantially lower than the natural frequency of the total accelerometer system are acting upon the base of the accelerometer, the seismic mass is forced to follow the vibrations, thereby acting on the piezoelectric element(s) with a force which is proportional to the seismic mass and the acceleration. Thereby, the inertial force acting on the piezoelectric element generates electrical charges on the element(s), which charges are substantially proportional to the applied acceleration.

When the piezoelectric element is subjected to compression forces during vibration, the accelerometer is of the compression type, and when the piezoelectric element is subjected to shear forces during vibration, the accelerometer is of the shear type. A compression type accelerometer is the simplest in its construction, however, currently available compression type accelerometers cannot measure very high-G accelerations accurately due to the limitations of existing accelerometer designs and the very wide required range of acceleration measurement. Such required very wide operating ranges of acceleration measurement are required in many munitions firing acceleration measurement in which the accelerations may be several tens of thousands of Gs or even well over 100,000 Gs. Such required wide operating ranges are also needed for measuring deceleration during a relatively rigid object impacting hard surfaces.

It will be appreciated by those skilled in the art that acceleration and deceleration can both be used to apply compressive load to the piezoelectric element of currently available compression type accelerometers by proper mounting of the accelerometer. In general, compression type accelerometers are configured to measure both acceleration and deceleration once mounted to the intended object. This is usually achieved by providing preloading springs to ensure that the piezoelectric element is not subjected to tensile loading as the direction of the object acceleration is changed. For this reason, hereinafter, the term acceleration is also intended to include deceleration and only the direction of acceleration of the object to which the accelerometer is attached is indicated.

The compression type accelerometers are generally sensitive to temperature transients since the ceramic piezoelectric material is pyroelectric in the axis of polarization. However, in applications such as in munitions or relatively rigid object impacting with hard surfaces, the acceleration duration to be measured is very short and may be in the order of a few or at most 10-20 milliseconds, which is too short to be affected by temperature transient around the object (for example, munitions housing) to affect its temperature.

In general, higher sensitivity can be obtained by an accelerometer that uses bending type piezoelectric elements. In such accelerometers, the inertia forces due to the acceleration of the seismic mass acts to bend a so-called "bender element," which has a layer of an electric conductive material sandwiched between two layers of piezoelectric material that are polarized in their direction of thickness. Thus, when the bender element is bent due to the application of the inertia forces, compressive stresses are generated in one of the two piezoelectric layers and tensile stresses are generated in the other piezoelectric layer. When the length of the bender element is significantly larger than the thickness of the element, the electrical charges generated on each of the two piezoelectric layers will be larger than the charges obtained if the inertia forces would have acted directly to compress or shear a piezoelectric element.

However, a disadvantage of bender element based accelerometers is that the piezoelectric material constitutes a major part of the mechanical construction of the device, which makes it difficult to optimize their construction to achieve high rigidity and high natural frequency. Accelerometers of this type are also sensitive to temperature transients since the electrodes are arranged on surfaces which are perpendicular to the axis of polarization.

In contrast to the compression type accelerometers, the shear type accelerometers, for which type of accelerometers the electrical signal is developed on surfaces parallel to the axis of polarization, have a low dynamic temperature sensitivity.

In addition, in applications such as those in gun-fired munitions and mortars or during an object impact with hard surfaces it is highly desirable to measure acceleration during firing setback and set-forward and for relatively rigid objects impacting hard targets to measure acceleration during the entire impact event period with enough accuracy. In some munitions, the setback acceleration may be tens of thousands of Gs or even higher than 100,000 Gs, which makes their measurement highly challenging, which currently available accelerometers cannot achieve.

It will be appreciated by those skilled in the art that spin-stabilized munitions are fired by rifled barrels, thereby subjecting the munitions to very high rotary acceleration as well as aforementioned high linear setback and set-forward accelerations.

In addition, current linear as well as rotary accelerometers using piezoelectric elements can be configured to have high sensitivity in a small acceleration range. The primary challenge is the development of accelerometers that can measure a very wide range of acceleration accurately.

FIG. 1A shows a cross-sectional view of a typical piezoelectric-based compression type accelerometer (transducer) of the prior art (see U.S. Pat. No. 4,447,755). The accelerometer comprises a contact pin 1, formed with a disk a, braced by a connecting cylinder b, continued by a key hexagon c, provided with a threaded section d, being for the purpose of fixing the accelerometer on the part (not shown) whose vibrations should be detected.

The suspension disk a of the pin 1 has one or more sensing elements A, made of a pair of piezoelectric rings 2 arranged with the faces of the same polarity on an intermediary disk e of a contact pin 3, provided with a terminal section f, which constitutes one of the two poles of the accelerometer.

The pin 3 is surrounded by an insulating sleeve 4 enclosed in the seismic mass B, having a threaded section g, which can be taken as the other pole and allows transducer connection for transmitting impulses generated by the piezoelectric rings 2.

At the opposite end, the cylindrical part 5 of the seismic mass B, is provided with an inner thread h, into which a gasket cover 6 is screwed engaging the contact pin 1.

Inside the casing 5, having the role of a seismic mass B, there is a preloaded spring disk 7 (Belleville washer) bracing disk a of the contact pin 1 against the seismic mass B.

The piezoelectric-based accelerometer, has the advantages of simple construction, at low cost, with increased performances and its weight is mostly the weight of the seismic mass, which is the active element, avoiding degradation of the vibrations to be detected.

Currently available compression type accelerometers, such as the one shown in FIG. 1A, have the problem of not being capable of accurately measuring a wide range of accelerations. This is the case since the range of force that can accurately be measured by a single piezoelectric element is limited. For example, for a given piezoelectric element, by increasing the size of the seismic mass, the resulting accelerometer becomes more sensitive to acceleration, but the range of accelerations that can be measured is limited to the compressive strength of the piezoelectric element material. On the other hand, by using smaller seismic mass the peak acceleration that can be measured is increased, but the accelerometer sensitivity is reduced. Thus, as expected for almost any sensor, accelerometer sensitivity and the level (peak) acceleration that can be measured compete.

It will be appreciated by those skilled in the art that the above conclusion also applies to all other currently available "single stage" linear and rotary accelerometers, for example to all the aforementioned shear type accelerometers, such as the following shear type accelerometer of the prior art shown in the schematic of FIG. 1B.

The basic design of a typical shear type accelerometer of prior art (U.S. Pat. No. 5,572,081) is shown in the isometric view of FIG. 1B. The accelerometer consists of the seismic mass B3 and the piezoelectric elements B4, which are arranged between the uprights B2. The seismic mass B3 and the piezoelectric elements B4 are mounted between the two uprights B2 and clamped therebetween by means of a clamping ring B5. The uprights B2 may be formed directly in the base B1 as shown in FIG. 1B, or joined thereto by way of screwing, welding, soldering or the like. A plurality of pairs of piezoelectric elements B4, with one or more seismic masses B3 may be assembled between the two uprights B2.

The clamping ring B5 may be used for clamping the elements between the uprights B2 by pressing it in place, or by shrinking or other manners onto the outer side of the uprights B2. The elements may alternatively be secured by means of a screw connection through the uprights, the piezoelectric elements, and the seismic mass, or by means of glue.

The piezoelectric elements B4 may be arranged with vertical and/or horizontal polarization directions, whereby the same accelerometer can register motion in several directions perpendicular to one another.

The accelerometer type of FIG. 1B is suited for measuring acceleration of linear movements, and the piezoelectric elements are mounted with their polarization directions parallel to the longitudinal axes of the uprights B2 or in three directions perpendicular to one another for measuring linear acceleration in those directions.

The accelerometer (body B1) is secured to the body, the acceleration of which is to be measured, and follows the movements of the body. As a result thereof, inertial forces arise between the uprights B2, the piezoelectric elements B4, and the seismic mass B3, proportional to the acceleration of the base B1.

The inertia forces generated by the acceleration in the axial (longitudinal) direction of the accelerometer cause a shear deformation of the piezoelectric elements, whereby an electric charge proportional to the acceleration is generated (when polarization directions of the piezoelectric elements B4 are parallel to the longitudinal axes of the uprights B2). This charge can then be measured by means of the associated electric equipment, usually as a voltage.

It is appreciated that the accelerometer can measure acceleration and deceleration in the axial direction of the object to which it is attached and generating charges of opposite voltages with each.

This shear type accelerometer with their polarization directions being parallel to the longitudinal axes of the uprights B2 become less sensitive to temperature transients as compared to other types of accelerometers.

It is, therefore, highly desirable to develop methods for the design of high precision linear and rotary accelerometers and related accelerometers that can accurately measure very high linear and rotary accelerations.

SUMMARY

A need therefore exists for accelerometers for measuring linear accelerations with very high precision.

A need also exists for accelerometers for measuring linear acceleration in a prescribed direction for measuring acceleration with precision in a very wide range, for example, up to tens of thousands of Gs and even higher, such as those experienced in munitions firing and during an object impact with hard surfaces.

A need also exists for accelerometers for measuring linear acceleration in a prescribed direction with minimal cross-sensitivity to rotational accelerations about the acceleration measurement direction and about directions perpendicular to the acceleration measurement direction.

A need also exists for accelerometers for measuring rotary accelerations with very high precision.

A need also exists for accelerometers for measuring rotary acceleration about a prescribed axis with precision in a very wide range and high rotary accelerations, such as those experienced by high-spin munitions firing.

It is therefore an object to provide linear accelerometers for measuring linear acceleration in a prescribed direction with high precision.

It is another object to provide linear accelerometers for measuring very high acceleration with precision in a prescribed direction.

It is yet another object to provide linear accelerometers for measuring linear acceleration with precision in a prescribed direction while exhibiting minimal cross-sensitivity to accelerations in the directions perpendicular to the prescribed measurement direction and to any rotational acceleration.

It is yet another object to provide rotary accelerometers for measuring rotary acceleration about a prescribed axis with high precision.

It is yet another object to provide rotary accelerometers for measuring very high rotary acceleration about a prescribed axis with precision.

Accordingly, herein is described linear accelerometers of several types for accurately measuring linear acceleration in a prescribed direction.

Herein is also described linear accelerometers for accurately measuring very high G linear acceleration inn a prescribed direction.

Herein is also described rotary accelerometers of several types for accurately measuring rotary accelerations, in particular very high rotary accelerations.

BRIEF DESCRIPTION OF THE DRAWINGS

These and other features, aspects, and advantages of the apparatus of the present invention will become better understood with regard to the following description, appended claims, and accompanying drawings where:

FIG. 12 illustrates the cross-sectional view of another embodiment of a shear type piezoelectric-based linear accelerometer configured from the design of the embodiment of FIG. 11 with two seismic masses and related components for measuring acceleration and deceleration above prescribed thresholds.

DETAILED DESCRIPTION

Figure 1A:
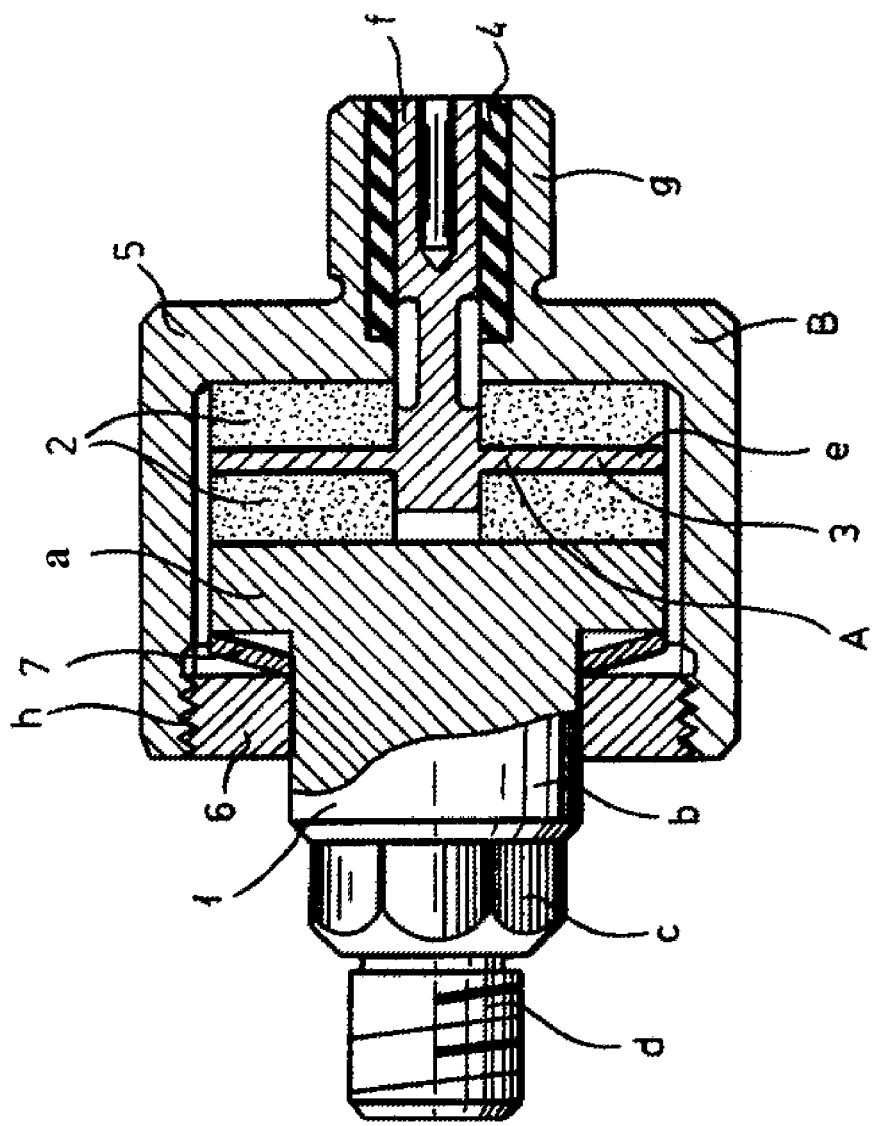
FIG. 1A illustrates the cross-sectional view of a piezoelectric-based compression type accelerometer of prior art.
Figure 1B:
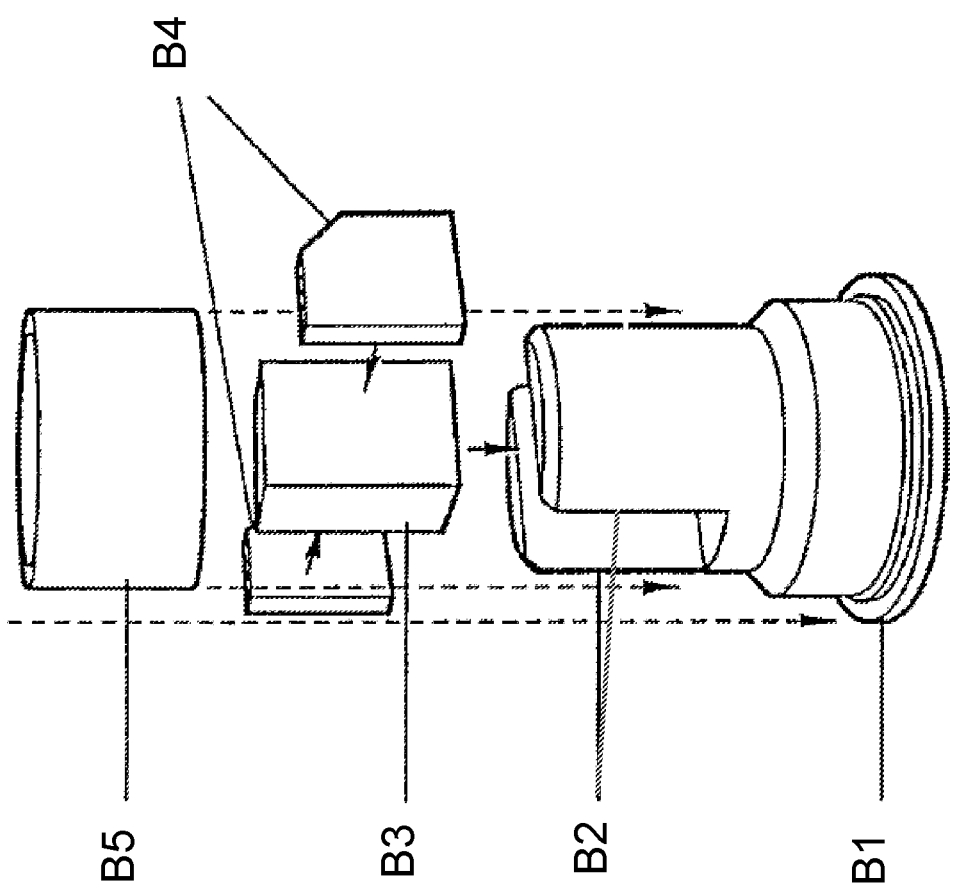
FIG. 1B illustrates the cross-sectional view of a piezoelectric-based shear type accelerometer of prior art.

Multi-stage accelerometer types are disclosed herein are intended to solve the shortcomings of the currently available linear and rotary accelerometers, such as those shown in FIGS. 1A and 1B, while allowing the development of highly accurate accelerometers for measurement of very high linear and rotary accelerations.

Figure 2:
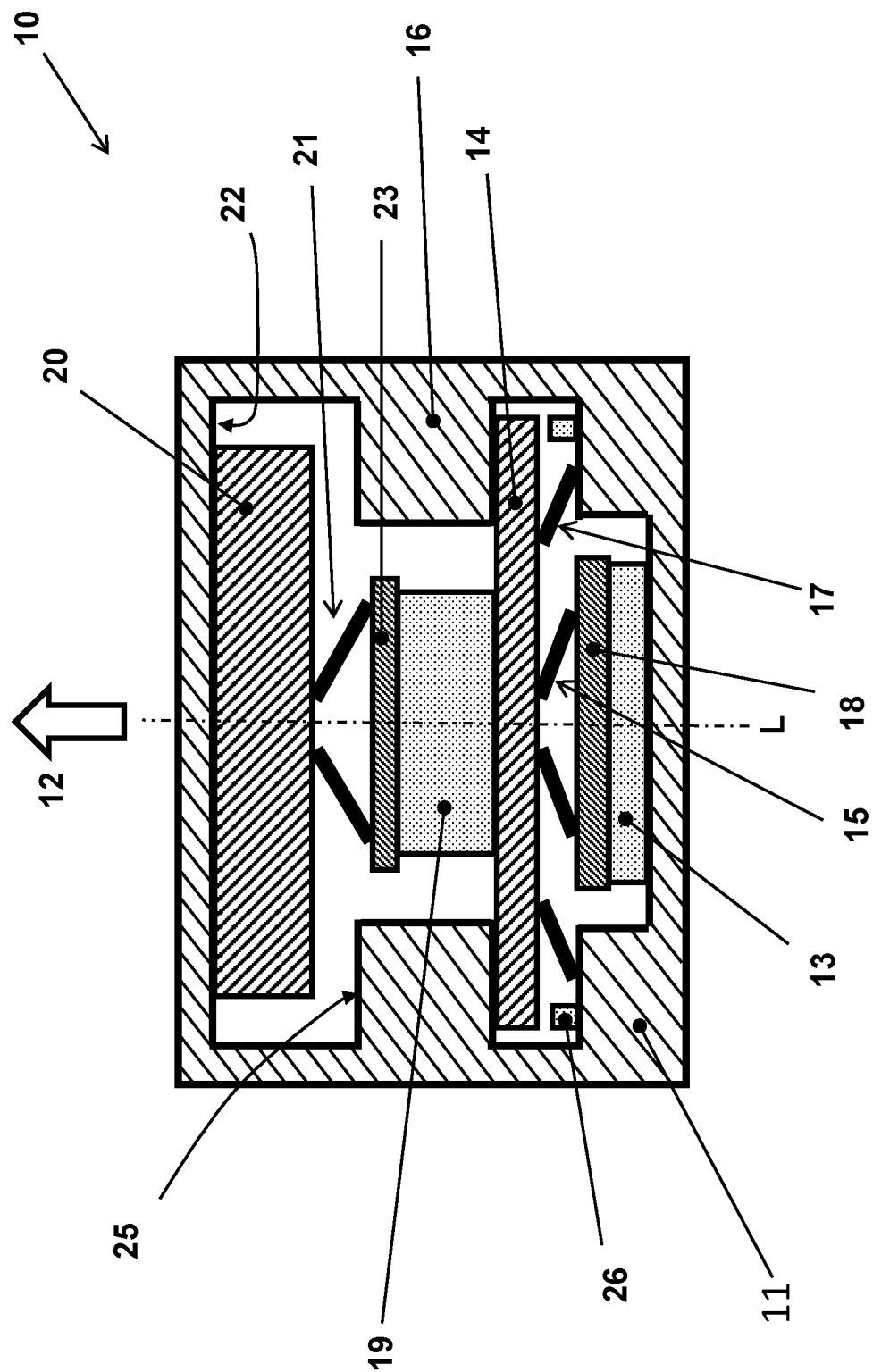
FIG. 2 illustrates the cross-sectional view of the first embodiment of a precision multi-stage piezoelectric-based linear accelerometer for measuring a wide range of linear acceleration.

The multi-stage accelerometer types are herein described by their application to a linear accelerometer. The basic design and operation of such multi-stage linear accelerometer is shown by the embodiment 10 of FIG. 2. For the sake of simplicity, the embodiment 10 of FIG. 2 is provided with only two stages. However, it will be appreciated by those skilled in the art that additional stages may also be similarly added to the linear accelerometer as is described below.

In the schematic of FIG. 2, a longitudinal cross-sectional view of a two-stage linear accelerometer embodiment 10 is shown. The two-stage linear accelerometer embodiment 10, hereinafter also referred to as a linear accelerometer or simply as an accelerometer, can be cylindrical in shape, with its longitudinal (central) axis L being in the vertical direction as viewed in the schematic of FIG. 2.

The two-stage linear accelerometer 10 is provided with a housing 11. The linear accelerometer 10 is configured to measure acceleration in the direction of the arrow 12. A first stage of the accelerometer consists of a compression type (axially poled) piezoelectric element 13, which is fixedly attached to the base of the housing 11, a seismic mass 14 and a compressively preloaded spring 15, which is used to keep the piezoelectric element 13 in compression. The housing 11 is provided with a step 16 to limit upward motion of the seismic mass 14 to allow compressive preloading of the compressive spring 15. A relatively rigid plate 18 can be provided over the piezoelectric element 13 to ensure that the compressive force of the compressively preloaded spring 15 is distributed nearly uniformly over the top surface of the piezoelectric element. An additional compressively preloaded spring 17 can also be provided as shown in the schematic of FIG. 2 to provide an additional force with which the seismic mass 14 is pressed against the step 16. The compressively preloaded springs 15 and 17 can be of a helical type or, as shown in FIG. 2, of a Belleville washer type for their relatively high stiffness and small height.

The second stage of the linear accelerometer embodiment 10 consists of a second compression type (axially poled) piezoelectric element 19, a seismic mass 20, a compressively preloaded spring 21, which is used to keep the piezoelectric element 19 in compression. The top surface 22 of the housing 11 is used to limit upward motion of the seismic mass 20 to allow compressive preloading of the compressive spring 21. A relatively rigid plate 23 can be provided over the piezoelectric element 19 to ensure that the compressive force of the compressively preloaded spring 21 is distributed nearly uniformly over the top surface of the piezoelectric element. The compressively preloaded spring 21 can also be of a helical type, or as shown in FIG. 2, of a Belleville washer type for their relatively high stiffness and small height.

The multi-stage linear accelerometer embodiment 10 of FIG. 2 functions as follows to accurately measure a wide range of linear acceleration. As the object to which the accelerometer 10 of FIG. 2 is attached begins to be subjected to increasing linear acceleration in the direction of the arrow 12, the inertial force due to the seismic mass 20 begins to deform the spring 21, thereby applying an increasing force to the piezoelectric element 19 via the relatively rigid plate 23. The spring force and the inertia forces due to the mass of the relatively rigid plate 23 (which can be significantly smaller than that of the seismic mass 20) and the spring 21 acting on the piezoelectric element 19 cause the piezoelectric element to generate electrical charges, which charges are substantially proportional to the applied acceleration and that can be measured by the sensor electronics (not described) to measure the level of applied acceleration in the direction of the arrow 12. Methods and electronics for measuring the voltage of charges generated in piezoelectric-based accelerometers (usually using a charge amplifier) are well known in the art and not discussed herein. Thus, only the output of the piezoelectric elements are discussed, such output being input into the well-known electronics for measuring the voltage of charges generated in piezoelectric-based accelerometers.

The force applied to the piezoelectric element 19 in addition to the inertia force due to the mass of the piezoelectric element 19 and the relatively rigid plate 23 and the spring 21 will in turn apply a force to the seismic mass 14. However, the compressive spring 17 is preloaded to a level to resist the total inertia force until the acceleration in the direction of the arrow 12 has reached a prescribed threshold, hereinafter indicated as $A_1$ (to indicate the first stage activation acceleration threshold). As a result, the compressively preloaded spring 17 prevents the seismic mass 14 from being displaced downwards.

Now as the level of acceleration in the direction of the arrow 12 reaches the aforementioned threshold level $A_1$, with any increase in the level of the acceleration, the aforementioned total inertia force (due to the mass of the seismic mass 20, the relatively rigid plate 23, the piezoelectric element 19 and the spring 21) and the inertia force due to the mass of the seismic mass 14 begin to deform the compressive springs 15 and 17. Then the deforming compressive spring 15 begins to apply an increasing force to the piezoelectric element 13 via the relatively rigid plate 23 together with the inertia force due to the generally small mass of the relatively rigid plate 18 and the spring 15. This causes the piezoelectric element 13 to generate electrical charges, which charges are substantially proportional to the total applied force to the piezoelectric element 13, which is in turn proportional to the applied acceleration in the direction of the arrow 12 above the aforementioned acceleration threshold $A_1$, and can be measured by the provided electronics (not described) as was previously described.

It will be appreciated by those skilled in the art that the downward travel of the seismic mass 14 may also be made to be limited by either the solid (e.g., fully compressed) thickness of the compressive spring 17 in the longitudinal axis direction or by physical stops 26 provided on the interior of the housing 11 to limit the amount of force that can be exerted on the piezoelectric element 13, which would also limit the peak acceleration in the direction of the arrow 12 that can be detected, to protect the element from failure.

It will be appreciated by those skilled in the art that the latter statement assumes that the mass of the relatively rigid plate 18 and the spring 17 are negligible as compared to the mass of the seismic mass 14, which is generally the case. It will also be appreciated by those skilled in the art that if desired, the contribution of the two masses can also be readily accounted for. In fact, the common practice in the art is to calibrate accelerometers before their use, in which case the all neglected effects, including the effective mass of the piezoelectric elements themselves are thereby accounted for.

The two-stage accelerometer embodiment 10 of FIG. 2 will therefore measure acceleration with the piezoelectric element 19 of its first stage up to the aforementioned acceleration threshold $A_1$. At which time, the piezoelectric element 13 of the accelerometer second stage will begin to measure accelerations above the first stage threshold $A_1$. It will be appreciated by those skilled in the art that by limiting the range of acceleration that has to be measured by both piezoelectric elements 13 and 19, the sensitivity with which the acceleration can be measured in both ranges is significantly increased since more sensitive piezoelectric elements and larger seismic masses can be used for each stage of the accelerometer.

It will also be appreciated by those skilled in the art that sensitivity of the piezoelectric element 13 of the second stage of the linear accelerometer embodiment 10 of FIG. 2 can be further and significantly increased by selecting the height of the seismic mass 20 and the step 16 of the housing 11 such that slightly after acceleration in the direction of the arrow 12 has reached the aforementioned acceleration threshold $A_1$, the seismic mass 20 is stopped against the top surface 25 of the stop 16, thereby preventing the seismic mass 20 to exert any force on the piezoelectric element 13. As a result, the size of the seismic mass 14 can be significantly increased, thereby allowing the sensitivity of the measured acceleration by the second stage of the accelerometer, i.e., by the piezoelectric element 13, to be significantly increased.

Figure 3:
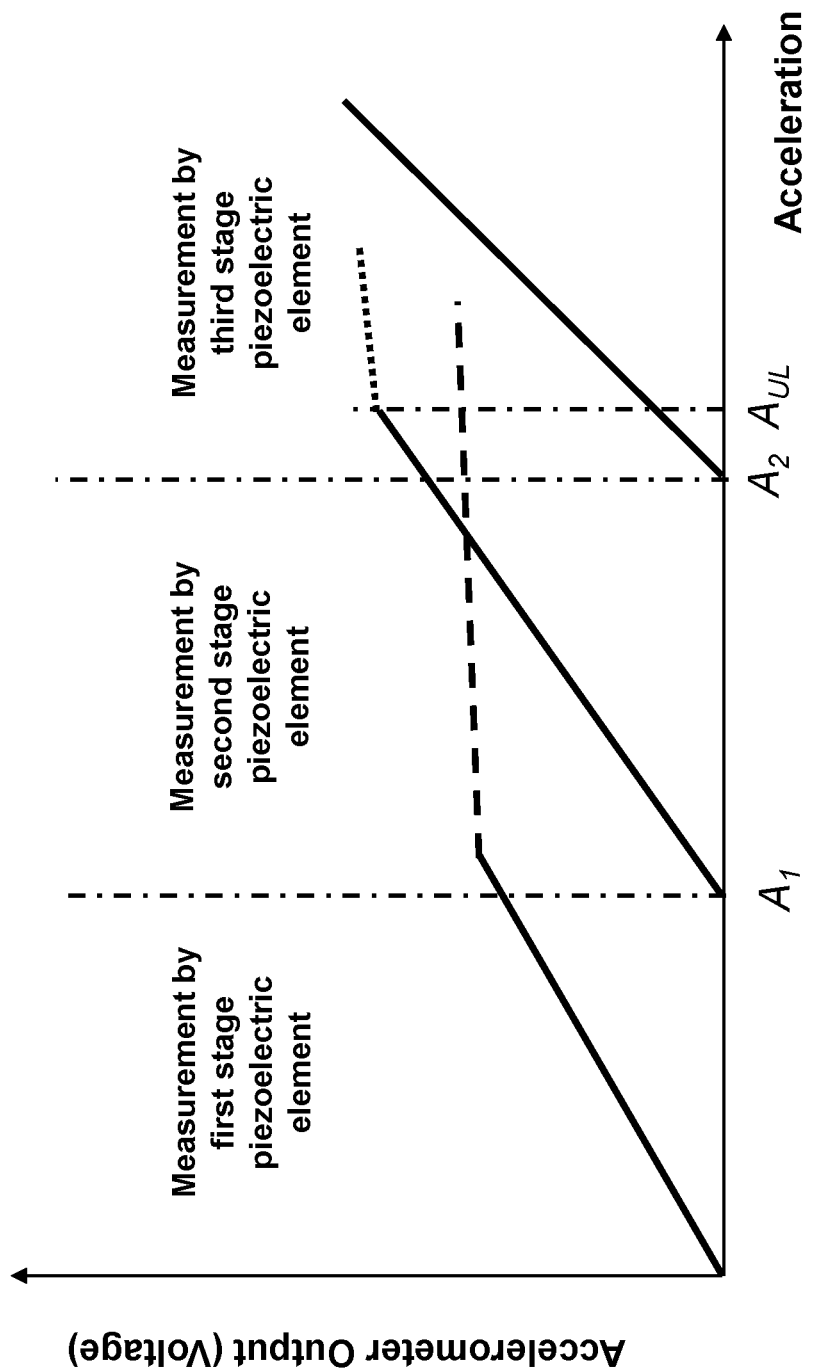
FIG. 3 is a typical plot of the measured response of the two-stage and three-stage accelerometers of FIGS. 2 and 3 to their full range of acceleration measurement.

A typical output (usually voltage from the sensor electronics) from the two-stage linear accelerometer of FIG. 2 is shown in the plot of FIG. 3. As can be seen in this plot, the acceleration in the direction of the arrow 12 is initially measured by the piezoelectric element of the first stage of the accelerometer as was previously described. Then as the aforementioned acceleration threshold $A_1$ is reached, the piezoelectric of the second stage of the accelerometer begins to measure accelerations above the threshold level $A_1$, as shown in the plot of FIG. 3. The accelerometer can be configured such that as the acceleration level passes slightly above the threshold level $A_1$, the output of the first stage piezoelectric element continues to increase until the seismic mass 20 is stopped by resting against the top surface 25 of the stop 16. Then as the acceleration in the direction of the arrow 12 is increased, the output of the piezoelectric element 19 of the accelerometer first stage will increase at a very low rate, essentially due to the relatively negligible mass of the relatively rigid plate 23, the spring 21 and effective mass of the piezoelectric material itself, as shown by the dashed line in the plot of FIG. 3. Similarly, the piezoelectric element 13 of the accelerometer second stage would measure accelerations above the acceleration threshold $A_1$ until the downward movement of the seismic mass 14 is stopped as it reaches the stop 26. Then as the acceleration in the direction of the arrow 12 is increased, the output of the piezoelectric element 13 of the accelerometer second stage would increase at a very low rate due to the relatively negligible mass of the relatively rigid plate 18, the spring 15 and effective mass of the piezoelectric material itself, as shown by the dotted line in the plot of FIG. 3, noting that the two-stage linear accelerometer of the embodiment 10 of FIG. 2 is configured to measure accelerations in the direction of the arrow 12 up to the level at which the seismic mass 14 is stopped against the stop 26, which is indicated as the acceleration level $A_{UL}$ in the plot of FIG. 3.

The two-stage linear accelerometer of FIG. 2 can be readily configured to develop multi-stage linear accelerometers with almost any number of desired stages to very accurately measurement of a very wide range of accelerations. As an example, such a three-stage linear accelerometer, indicated generally by reference numeral 30, is shown in the schematic of FIG. 4, which adds another stage to the two-stage linear accelerometer embodiment of FIG. 2.

Figure 4:
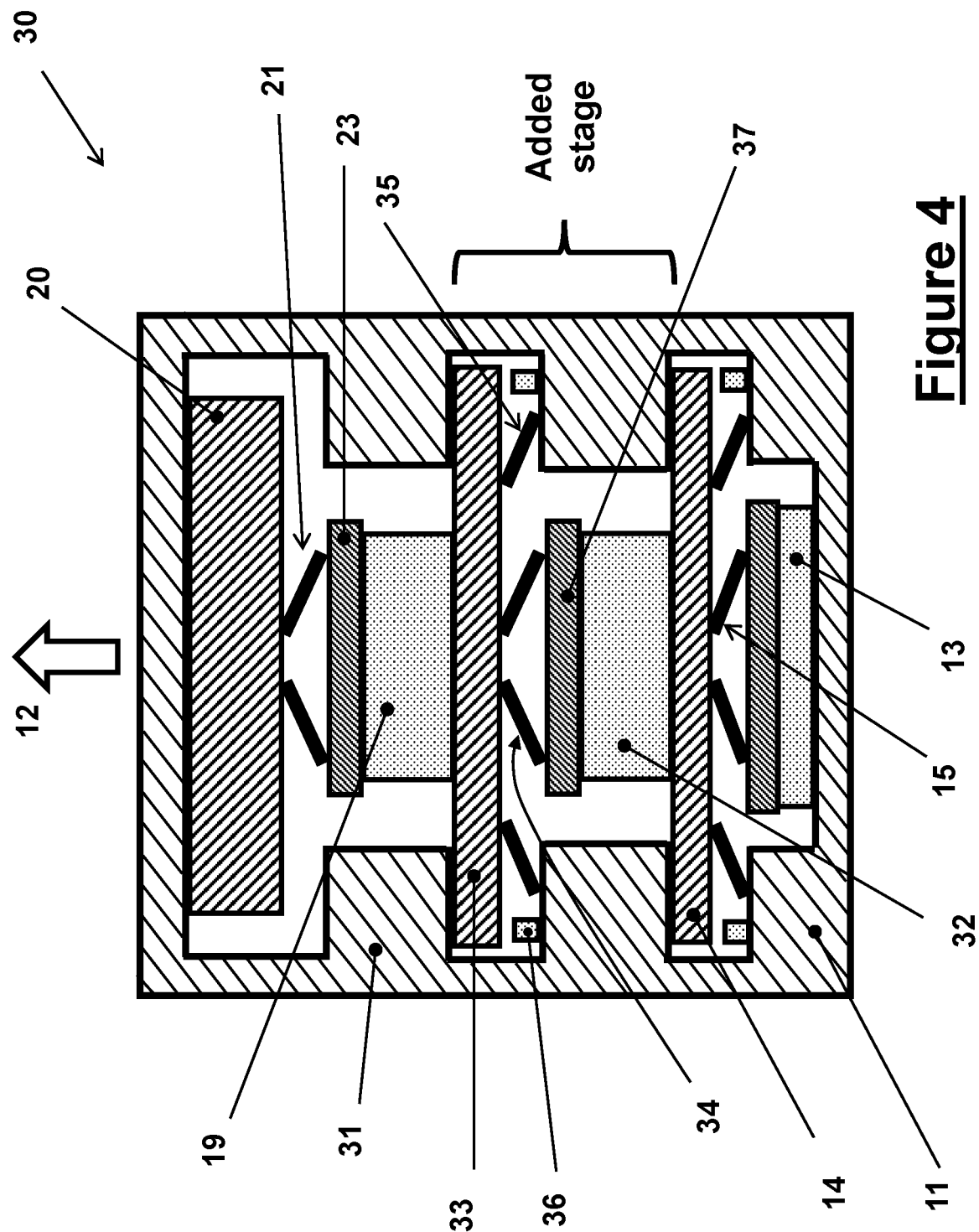
FIG. 4 illustrates the cross-sectional view of a three-stage precision piezoelectric-based linear accelerometer illustrating the method of construction of such multi-stage accelerometers with a desired number of stages.

The three-stage linear accelerometer embodiment 30 of FIG. 4 can be seen to be constructed by simply adding the indicated third stage, which is similar in construction to that of the second stage (lower stage as viewed in the embodiment of FIG. 2) and incorporating the required space in the accelerometer housing 31. In the schematic of FIG. 4 the other two stages of the accelerometer and their components are identical to those of the accelerometer embodiment of FIG. 2. Similar to the second stage of the embodiment of FIG. 2, the added third stage also consists of a piezoelectric element 32 covered by a relatively rigid plate 37 (similar to piezoelectric element 13 and the relatively rigid plate 18 of FIG. 2), a seismic mass 33 (similar to the seismic mass 14 of FIG. 2), and similarly positioned compressively preloaded springs 34 and 35 (similar to the compressively preloaded springs 15 and 17, respectively). A stop 36, similar to the stop 26 of the embodiment of FIG. 2, is also provided for the seismic mass 33.

The three-stage linear accelerometer embodiment 30 of FIG. 4 measures acceleration in the direction of the arrow 12 as was described for the two-stage accelerometer embodiment 10 of FIG. 2, but with its added third stage. The three-stage linear accelerometer embodiment 30 measures linear acceleration in the direction of the arrow 12 initially with the piezoelectric element 19 of its first (top) stage similar to the accelerometer embodiment of FIG. 2 up to an acceleration threshold $A_1$. The accelerometer is configured such that just before the acceleration threshold is reached, the seismic mass 33 begins to move downward, thereby beginning to deform the compressively preloaded spring 34 and applying a force to the second (added) stage piezoelectric element 32, as was previously described for the accelerometer embodiment of FIG. 2. Then as the level of acceleration increases, the piezoelectric element 32 provides increasing output charges corresponding to the level of acceleration above the acceleration threshold $A_1$ until the seismic mass 33 reaches the stop 36, indicating a second acceleration threshold $A_2$. Similar to the accelerometer embodiment of FIG. 2, the accelerometer 30 is also configured such that just before the acceleration threshold $A_2$ is reached, the seismic mass 14 begins to move downward, thereby beginning to deform the compressively preloaded spring 15 and applying a force to the third stage piezoelectric element 13, as was previously described for the accelerometer embodiment of FIG. 2.

A typical output (usually voltage from the sensor electronics) from the three-stage linear accelerometer of FIG. 3 is also similarly shown in the plot of FIG. 3.

The housing 11 and 31 of the embodiments of FIGS. 2 and 4, respectively, may be constructed in several ways for ease of the accelerometer assembly and compressively preloading the provided springs. One low-cost and relatively simple method is described using the schematic of FIG. 5 as applied to the two-stage accelerometer embodiment 10 of FIG. 2, which can be readily seen to be also applicable to accelerometers with any number of stages.

Figure 5:
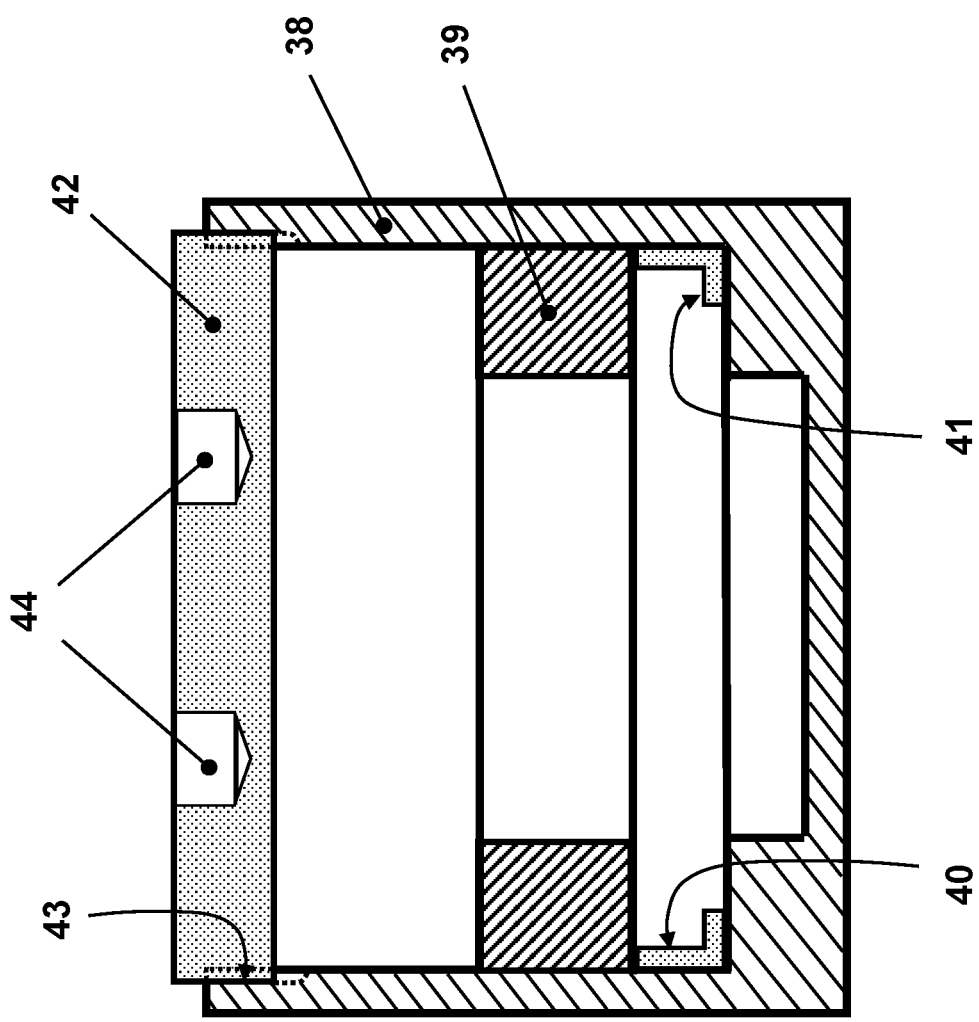
FIG. 5 illustrates one method of constructing the housing of the two-stage linear accelerometers of FIG. 2 and similarly the housing of any multi-stage linear accelerometer for ease of construction and assembly.

As can be seen in the schematic of FIG. 5, the housing 11 of the linear accelerometer embodiment 10 of FIG. 2 is constructed with the housing 38, which is readily fabricated by turning. The stop 16, FIG. 2, is provided with the ring 39, which is held at the required position by the spacer ring 40, which is provided by a step 41, which serves as the stop 26 (FIG. 2). During the accelerometer assembly, the piezoelectric element 13 together with its attached relatively rigid plate 18, the springs 15 and 17, the seismic mass 14, FIG. 2, and the spacer ring 40 are positioned inside the housing 38 before assembling the ring 39. The remaining components of the accelerometer are then positioned inside the housing 38. The threaded cap 42 is then used to close the housing as well as to preload the compressive springs to the desired level through the provided threads 43 on the top portion of the housing 38. The cap 42 is provided with properly spaced non-through holes 44 or other means well known in the art to engage a proper wrench for its tightening. The piezoelectric leads are passed through provided holes (not shown) in the housing 38.

The two-stage linear accelerometer of FIG. 2 can also be readily used to develop a single-stage linear accelerometers for measuring acceleration above a threshold level (corresponding to the aforementioned threshold level $A_1$ for the embodiment of FIG. 2). Such a single-stage linear accelerometer embodiment 45 for measuring acceleration above the threshold level, constructed with the second stage portion of the linear accelerometer embodiment 10 of FIG. 2, is shown in the schematic of FIG. 6.

Figure 6:
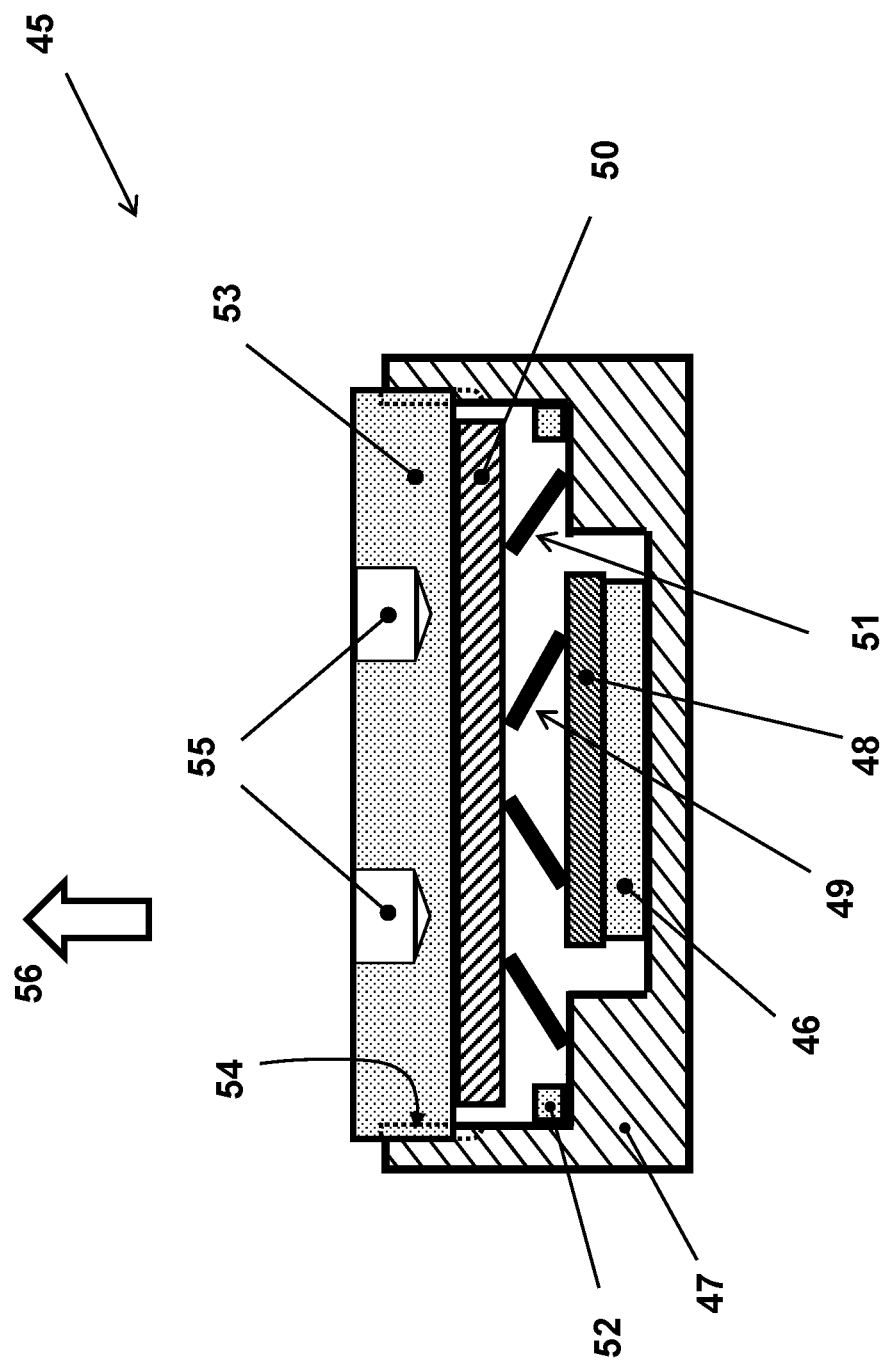
FIG. 6 illustrates the cross-sectional view of another embodiment of a piezoelectric-based linear accelerometer using a single stage for measuring linear acceleration above a prescribed acceleration threshold.

The single-stage linear accelerometer embodiment 45 of FIG. 6 can be seen to be constructed by the second stage of the linear accelerometer embodiment 10 of FIG. 2. The single-stage linear accelerometer embodiment 45 of FIG. 6 similarly uses a piezoelectric element 46 (13 in the embodiment of FIG. 2), which is fixedly attached to the base of the accelerometer housing 47. A relatively rigid plate 48 (18 in the embodiment of FIG. 2) is attached to the top surface of the piezoelectric element 46 to distribute the force applied by the compressively preloaded spring 49 (15 in the embodiment of FIG. 2) over the surface of the piezoelectric element. A seismic mass 50 (14 in the embodiment of FIG. 2), and similarly positioned compressively preloaded spring 51 (17 in the embodiment of FIG. 2) are also provided. A stop 52, similar to the stop 26 of the embodiment of FIG. 2, is also provided for the seismic mass 50. The stop 52 may be integral to the housing 47 or a separate ring that is either pressed in place or fixedly attached to the housing using well known adhesives or other known means such as a threaded connection or a press fit connection. The threaded cap 53 is then used to close the housing as was described for the housing of FIG. 5, as well as to preload the compressive springs 49 and 51 to the desired level through the provided threads 54 on the top portion of the housing 47. The cap 53 is provided with properly spaced non-through holes 55 or other means well known in the art to engage a proper wrench for its tightening. The piezoelectric leads can be passed through provided holes (not shown) in the housing 47.

The single-stage linear accelerometer 45 of FIG. 6 measures acceleration in the direction of the arrow 56 as was described for the two-stage accelerometer embodiment 10 of FIG. 2, after the acceleration threshold $A_1$ has been reached, indicated as the "measurement by second stage piezoelectric element" in the plot of FIG. 3. As was previously described for the embodiment 10 of FIG. 2, the level of the acceleration threshold $A_1$ is determined by the level of compressive preloading of the spring 51 and the mass of the seismic mass 53. Then as the level of acceleration increases above the acceleration threshold $A_1$, the piezoelectric element 46 provides increasing output charges (usually voltage from the sensor electronics) corresponding to the level of acceleration above the acceleration threshold $A_1$ until the seismic mass 50 reaches the stop 52, indicating the limit of acceleration that can be measured by the accelerometer. The typical output of the accelerometer (usually voltage from the sensor electronics) is from the single-stage linear accelerometer 45 of FIG. 6 is also similarly shown in the plot of FIG. 3.

Figure 6A:
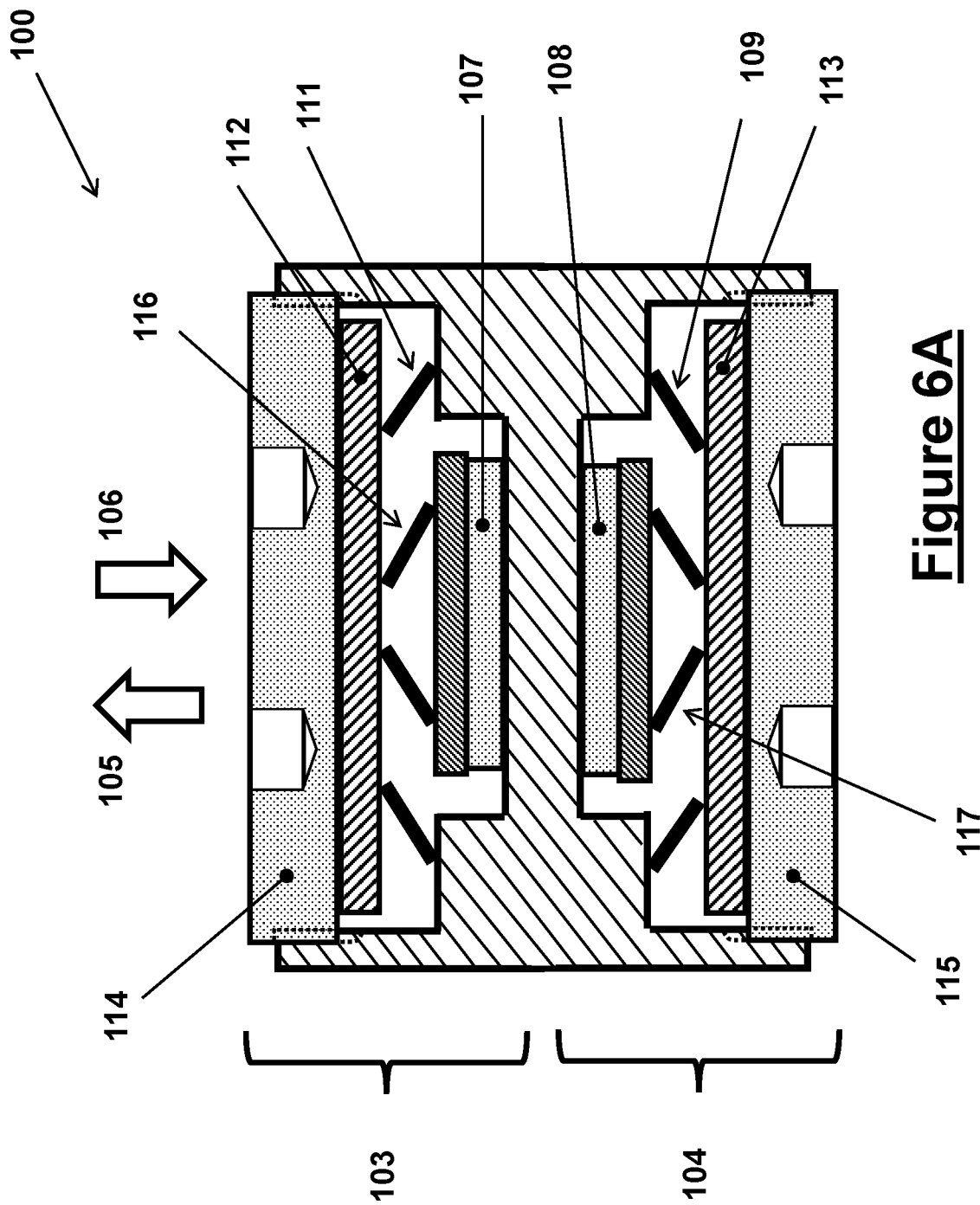
FIG. 6A illustrates the cross-sectional view of another embodiment of a piezoelectric-based linear accelerometer configured with two accelerometer embodiments of FIG. 6 for measuring acceleration and deceleration above prescribed thresholds.

In an alternative embodiment, two linear accelerometer embodiments 45 of FIG. 6 are integrated to form a single piezoelectric-based accelerometer as shown in the schematic of FIG. 6A and indicated as the embodiment 100. As can be seen in the schematic of FIG. 6A, the linear accelerometer embodiment 100 of FIG. 6A is obtained by merging the housings of two linear accelerometer embodiment 45 units, one indicated by the numeral 103 and the other as inverted and indicated by the numeral 104. The resulting piezoelectric-based linear accelerometer embodiment 100 is now capable of measuring acceleration in the direction of the arrow 105 above a prescribed acceleration threshold by the piezoelectric element 107 of the unit 103 as was described for the embodiment 45 of FIG. 6. Acceleration in the direction of the arrow 106 above a certain prescribed threshold is similarly measured by the piezoelectric element 108 of the unit 104. The level of the acceleration thresholds for the acceleration in the direction of the arrow 105 and 106, which can differ from each other, are determined by the level of the preloading of the compressive spring 111 and mass of the seismic mass 112, and the preloading of the compressive spring 109 and the mass of the seismic mass 113, respectively. The compressive preloading levels of the springs 111 and 109 are set and adjusted by the threaded caps 114 and 115, respectively, as was described for the embodiment 45 of FIG. 6.

It will be appreciated by those skilled in the art that in the linear accelerometer embodiment 100 of FIG. 6A, the acceleration threshold above which acceleration in the direction of the arrows 105 and 106 are measured may be set at almost any level, including zero, i.e., the compressive springs 111 and 109 may even be eliminated. In which case, i.e., with the compressive springs 111 and 109 removed, the accelerometer can measure the full range of acceleration and deceleration of the object to which it is attached, i.e., acceleration in the direction of both arrows 105 and 106. It is also appreciated that a certain application may require that only one of the two compressive springs 111 and 109 be removed. In all cases, the compressive springs 116 and 117 are still desired to be preloaded to certain level to ensure that their contact with their corresponding piezoelectric and seismic mass sides are not lost. The accelerometer may also be provided with stops (not shown) similar to the stop 52 in the embodiment of FIG. 6 for both seismic masses 112 and 113 to protect the piezoelectric elements 107 and 108, respectively.

It will also be appreciated by those skilled in the art that pairs of all linear accelerometer embodiments that are configured to measure acceleration in only one direction, such as the linear accelerometer embodiments 10 and 30 of FIGS. 2 and 4, respectively, may also be combined as was described for the embodiment 100 of FIG. 6A to enable them to measure both acceleration and deceleration.

It will be appreciated by those skilled in the art that compressive type linear accelerometers of prior art (for example, the aforementioned U.S. Pat. No. 4,447,755 or U.S. Pat. No. 4,359,658) suffer from the shortcoming related to the possibility of their piezoelectric element being prone to damage due to overloading when the applied acceleration is significantly above their design level. This shortcoming is eliminated by the design of the single and multi-stage linear accelerometers of FIGS. 2, 4 and 6.

It will also be appreciated by those skilled in the art that multiple single-stage linear accelerometers of the type of the embodiment 45 of FIG. 6 may be used to measure a wide range of accelerations, with each accelerometer configured to cover slightly overlapping acceleration ranges to cover the full range of acceleration to be measured. As such, acceleration in each range can be measured very accurately by highly sensitive single-stage accelerometer by the provision of a relatively large seismic mass. It will also be appreciated that the very simple design of the single-stage linear accelerometers of the type of the embodiment 45 of FIG. 6 allows its low-cost construction and readily adjustable to the desired range of acceleration to be measured by the choice of proper spring rate for the spring 51 and/or by adjusting its preloading level.

It will also be appreciated by those skilled in the art that the multiple single-stage linear accelerometers of the type of the embodiment 45 of FIG. 6 may be packaged in a single housing. The piezoelectric elements may also be connected to a single electronic circuit to provide a single output (usually voltage from the sensor electronics).

An alternative compressive type multi-stage linear accelerometer will now be described with regard to a two-stage accelerometer embodiment 60 shown in the schematic of FIG. 7. The accelerometer embodiment 60 of FIG. 7 is similar to the design of the accelerometer embodiment 10 of FIG. 2, except that it used only a single piezoelectric element for acceleration measurement for the entire range of its acceleration measurement.

Figure 7:
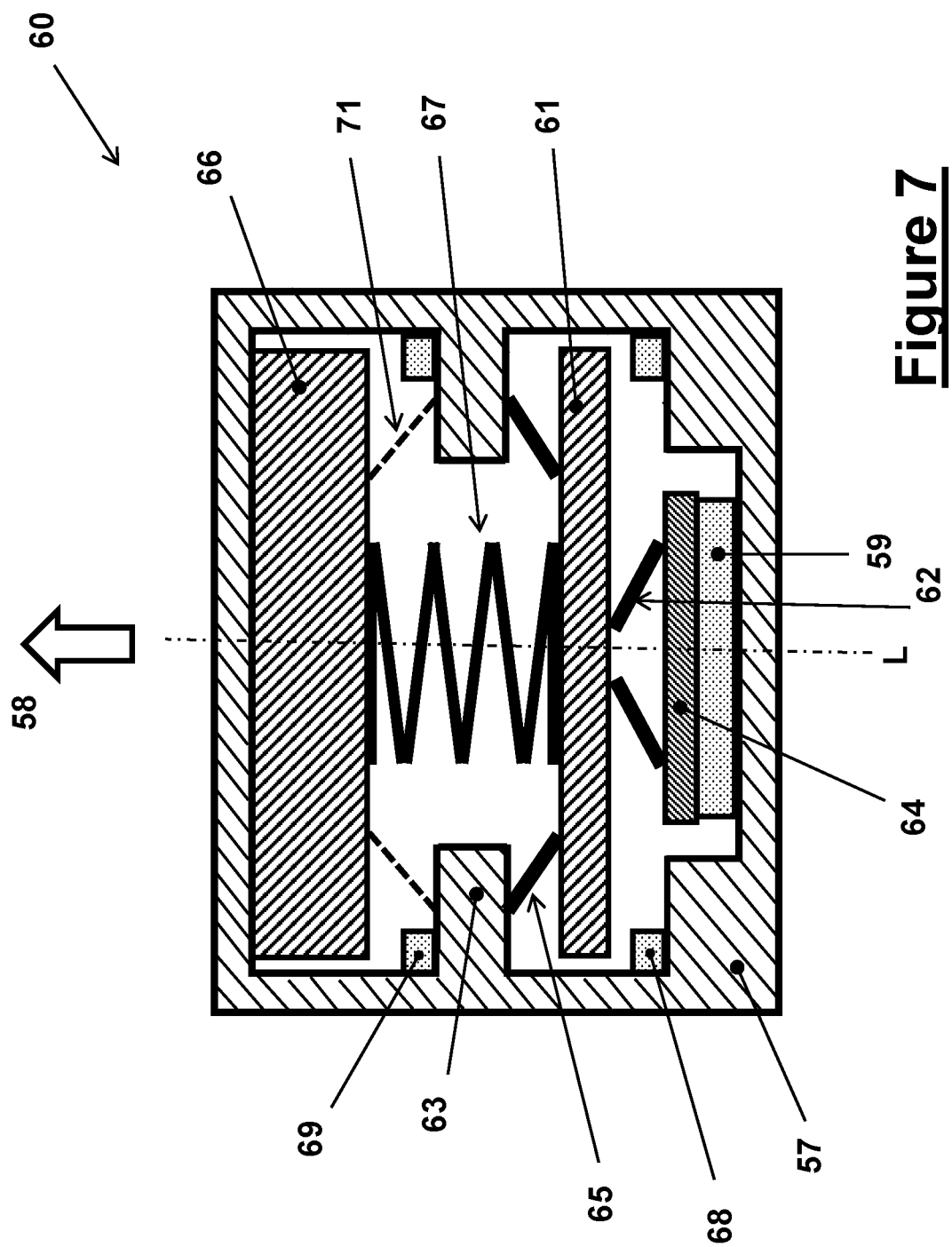
FIG. 7 illustrates the cross-sectional view of another embodiment of a two-stage piezoelectric-based linear accelerometer configured for accurate measurement of a relatively large range of acceleration with a single piezoelectric element.

In the schematic of FIG. 7, the longitudinal cross-sectional view of the two-stage linear accelerometer embodiment 60 is shown. The two-stage linear accelerometer embodiment 60 may also be cylindrical in shape, with its long axis L being in the vertical direction as viewed in the schematic of FIG. 7.

The two-stage linear accelerometer 60 is provided with a similar housing 57, which is configured to measure acceleration in the direction of the arrow 58. The accelerometer uses a similar compression type (axially poled) piezoelectric element 59, which is fixedly attached to the base of the housing 57, the seismic mass 61, a compressively preloaded spring 62, which keeps the piezoelectric element 59 in compression. The housing 57 is provided with a step 63, which is used to support the compressively preloaded spring 65, which is used to apply a compressive force to the seismic mass 61. The stop 68, which may be a ring inside the housing 57 or integral to the housing limits downward movement of the seismic mass 61. A thin and relatively rigid plate 64 can be provided over the piezoelectric element 59 to ensure that the compressive force of the compressively preloaded spring 62 is distributed nearly uniformly over the top surface of the piezoelectric element. The compressively preloaded spring 62 can be of a helical type of a Belleville washer type or the like for their relatively high stiffness and small height.

The second stage of the linear accelerometer embodiment 60 consists of a seismic mass 66, a compressively preloaded spring 67, which is positioned between the two seismic masses 61 and 66. The top inner surface of the housing 57 is used to limit upward motion of the seismic mass 66 to allow compressive preloading of the compressive spring 67. The stop 69, which may also be a ring inside the housing 57 or integral to the housing, limits downward movement of the seismic mass 66.

The multi-stage linear accelerometer embodiment 60 of FIG. 7 functions as follows to accurately measure a wide range of linear accelerations. As the object to which the accelerometer 60 of FIG. 7 is attached begins to be subjected to increasing linear acceleration in the direction of the arrow 58, the inertial forces due to the seismic masses 66 and 61 begin to deform the springs 67 and 62, thereby applying an increasing force to the piezoelectric element 59 via the relatively rigid plate 64. The compressive force applied to the piezoelectric element 59 by the spring 62 causes the piezoelectric element to generate electrical charges, which charges are substantially proportional to the applied acceleration and that can be measured by the sensor electronics (not described) to measure the level of applied acceleration in the direction of the arrow 58. As was previously indicated, methods and electronics for measuring the voltage of charges generated in piezoelectric-based accelerometers (usually using a charge amplifier) is well known in the art.

Now as the level of acceleration in the direction of the arrow 58 is increased, at a prescribed acceleration level $A_L$, the seismic mass 66 reaches the stop 69. Then, as the acceleration level in the direction of the arrow 58 is further increased, only the inertia force due to the seismic mass 61 causes the force acting on the piezoelectric element 59 through the spring 62 to increase. As a result, the accelerometer 60 can measure a wider range of acceleration in the direction of the arrow 58 through the described reduction of the effective seismic mass by the stopping of the seismic mass 66 against the stop 69. The inertial force due to the mass of the thin and relatively rigid plate 64 and springs 62, 65 and 67 also add to the force, even though usually relatively small amount, that is experienced by the piezoelectric element 59. This causes the piezoelectric element 59 to generate further electrical charges, which charges are substantially proportional to the total applied force to the piezoelectric element 50, which is in turn proportional to the applied acceleration in the direction of the arrow 58 above the aforementioned acceleration threshold $A_L$, and can be measured by the sensor electronics (not described) as was previously described.

It will be appreciated by those skilled in the art that the downward travel of the seismic mass 61 may also be made to be limited by the stop 68 that is provided to limit the amount of force that can be exerted on the piezoelectric element 59, which would also limit the peak acceleration in the direction of the arrow 58 that can be detected by the accelerometer, to protect the piezoelectric element from failure.

The two-stage accelerometer embodiment 60 of FIG. 7 will therefore measure acceleration with the piezoelectric element 66 of its first stage up to the aforementioned acceleration threshold $A_L$ with a relatively large seismic mass (of the seismic masses 66 and 61—neglecting significantly small masses of the springs and the thin and relatively rigid plate 64), therefore can be configured to be very sensitive in this range. As the acceleration is increased beyond the threshold level $A_L$, the active mass of the seismic mass is reduced to that of the seismic mass 61, allowing the piezoelectric element 59 to measure a significantly higher level of acceleration.

Figure 8:
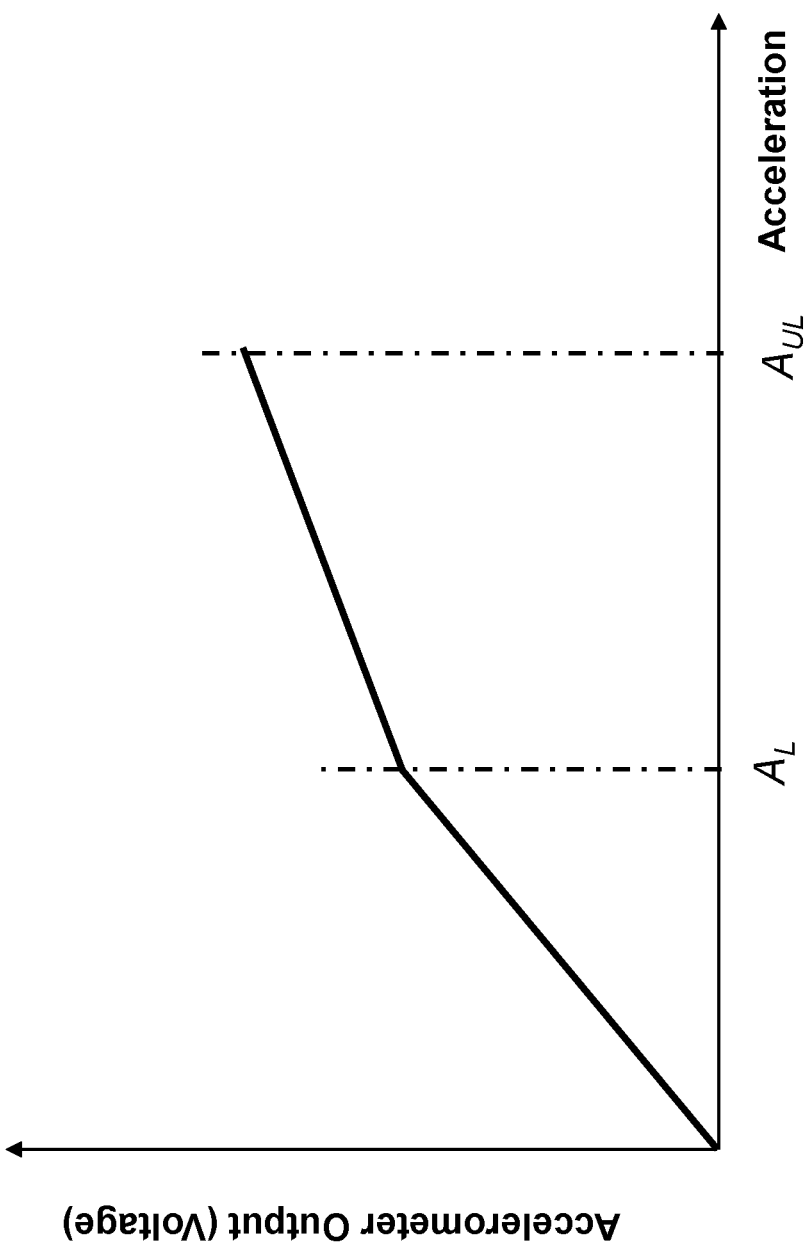
FIG. 8 is a typical plot of the measured response of the two-stage and three-stage accelerometers of FIG. 7 to its full range of acceleration measurement.

A typical output (usually voltage from the sensor electronics) from the two-stage linear accelerometer of FIG. 7 is shown in the plot of FIG. 8. As can be seen in this plot, the acceleration in the direction of the arrow 58 is initially measured by the piezoelectric element 59 of the first stage of the accelerometer as was previously described. Then as the acceleration threshold $A_L$ is reached, the seismic mass 66 is stopped, thereby the slope of the acceleration vs. accelerometer output voltage is reduced. The output of the piezoelectric element continues to increase until the seismic mass 61 is also stopped against the stop 68, at which point the maximum detectable acceleration level $A_{UL}$, is reached.

It is appreciated by those skilled in the art that by providing a compressively preloaded spring 71 (shown by dashed lines) between the step 63 and the seismic mass 66 as shown in the schematic of FIG. 7, the accelerometer embodiment 60 is configured to begin to measure acceleration above a prescribed level as was described for the accelerometer embodiment 45 of FIG. 6.

Figure 9:
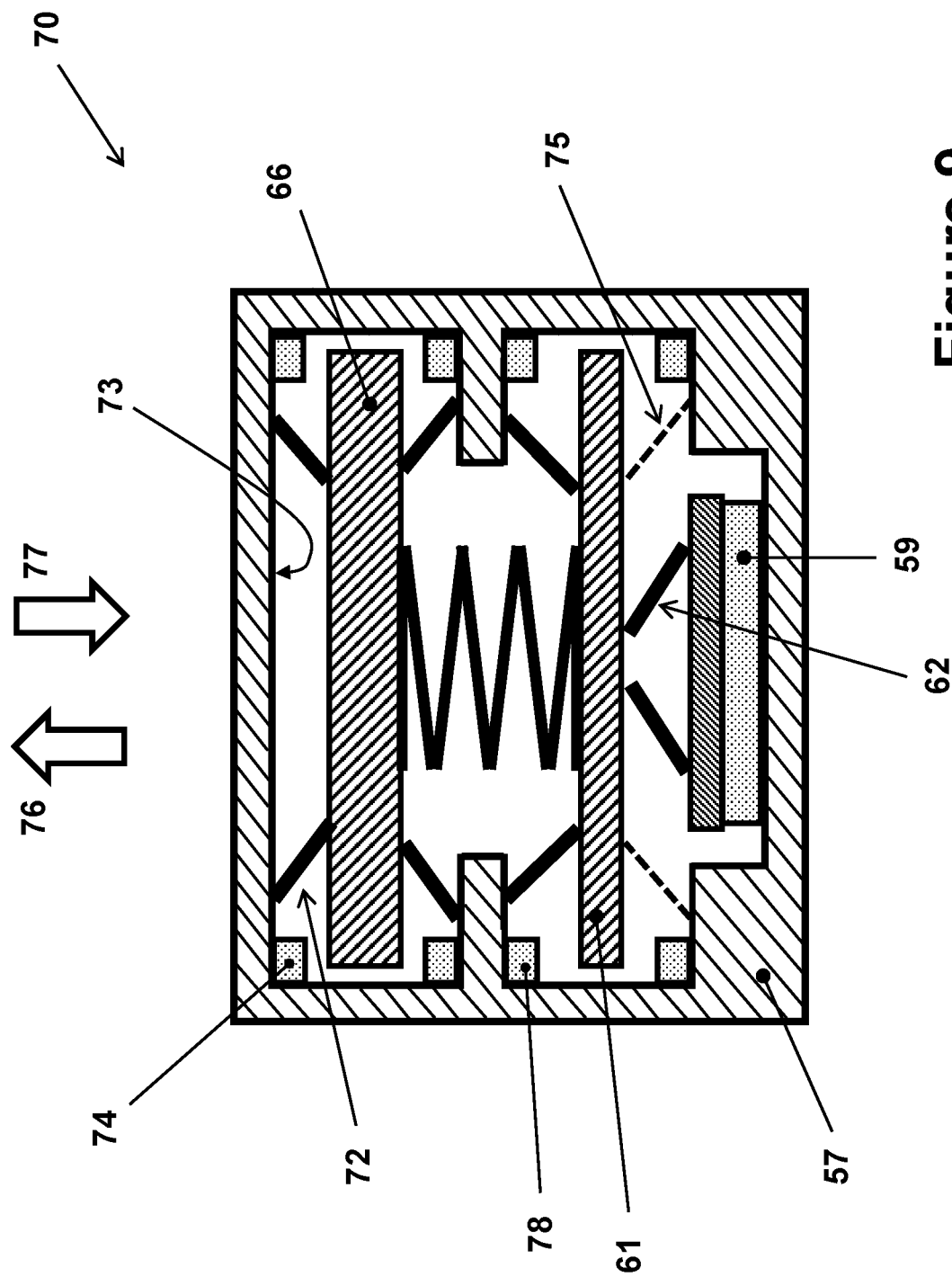
FIG. 9 illustrates the cross-sectional view of an alternative embodiment of the two-stage piezoelectric-based linear accelerometer of FIG. 7, configured for accurate measurement of a relatively large range of acceleration and deceleration with a single piezoelectric element.

The two-stage accelerometer embodiment 60 of FIG. 7 may be readily modified to allow the accelerometer to measure both acceleration and deceleration. Such a modified two-stage accelerometer, indicated as the embodiment 70, is shown in the schematic of FIG. 9. All components of the accelerometer embodiment 70 are identical to those of the embodiment 60 of FIG. 7, except that it is provided with the additional compressively preloaded spring 72 between the seismic mass 66 and the top inner surface 73 of the housing 57. The stop 74 is also provided to limit the upward motion of the seismic mass 66. When required depending on the level of acceleration and deceleration to be measured, a compressively preloaded spring 75 may also be provided as shown in FIG. 9 to reduce the force applied to the piezoelectric element 59.

It will be appreciated by those skilled in the art that the accelerometer embodiment 70 of FIG. 9 can now measure acceleration in the direction of the arrow 76 as well as acceleration in the direction of the arrow 77 (i.e., deceleration of the object to which the accelerometer is attached). The accelerometer 70 measures acceleration in the direction of the arrow 76 as was described for the embodiment 60 of FIG. 7. When the accelerometer 70 is subjected to acceleration in the direction of the arrow 77, the larger inertia force due to the larger seismic mass 66 would first dominate and move the seismic mass upward, while the inertial force due to the mass of the seismic mass 61 will also force it upward. As a result, compressive force of the compressively preloaded spring 62 on the piezoelectric element 59 is reduced. As the level of acceleration in the direction of the arrow 77 is increased, at some point the seismic mass 66 is stopped against the stop 74. From that point on, as the acceleration in the direction of the arrow 77 is increased, only seismic mass 61 is left to generate an inertia force to allow it to move further upward, thereby further reducing the compressive force of the compressively preloaded spring 62 on the piezoelectric element 59. The accelerometer can measure acceleration in the direction of the arrow 77 up to the level at which the seismic mass 61 has been stopped by the stop 78.

As the compressive force of the compressively preloaded spring 62 on the piezoelectric element 59 is reduced, the piezoelectric element generates charges (with opposite polarity to when it is subjected to increasing compressive loading), which charges are substantially proportional to the reduction in its compressive loading, which is in turn proportional to the applied acceleration in the direction of the arrow 77.

It will be appreciated by those skilled in the art that similar to the output of the embodiment of FIG. 7 in response to acceleration in the direction of the arrow 58 (76 in FIG. 9) shown in the plot of FIG. 8, the output of the embodiment 70 of FIG. 9 will also initially have a much steeper slope (i.e., the accelerometer will be more sensitive) until the seismic mass 66 is stopped against the stop 74, after which the slope of the output will similarly decrease. The accelerometer response to acceleration in the direction of the arrow 76 will be similar to that described for the embodiment of FIG. 7.

It will also be appreciated by those skilled in the art that the spring rates and compressive preloading levels of the accelerometer springs are selected such that for the full ranges of accelerations in the directions of the arrows 76 and 77 the springs would never completely lose their compressive preloading.

It will also be appreciated by those skilled in the art that the two-stage accelerometer embodiments 60 and 70 of FIGS. 7 and 9, respectively, may also be readily configured with more stages as was described for the embodiments 10 and 30 of FIGS. 2 and 4, respectively. In addition, the housings of the accelerometers may also be constructed as was described for the housing construction of FIG. 5.

Figure 10:
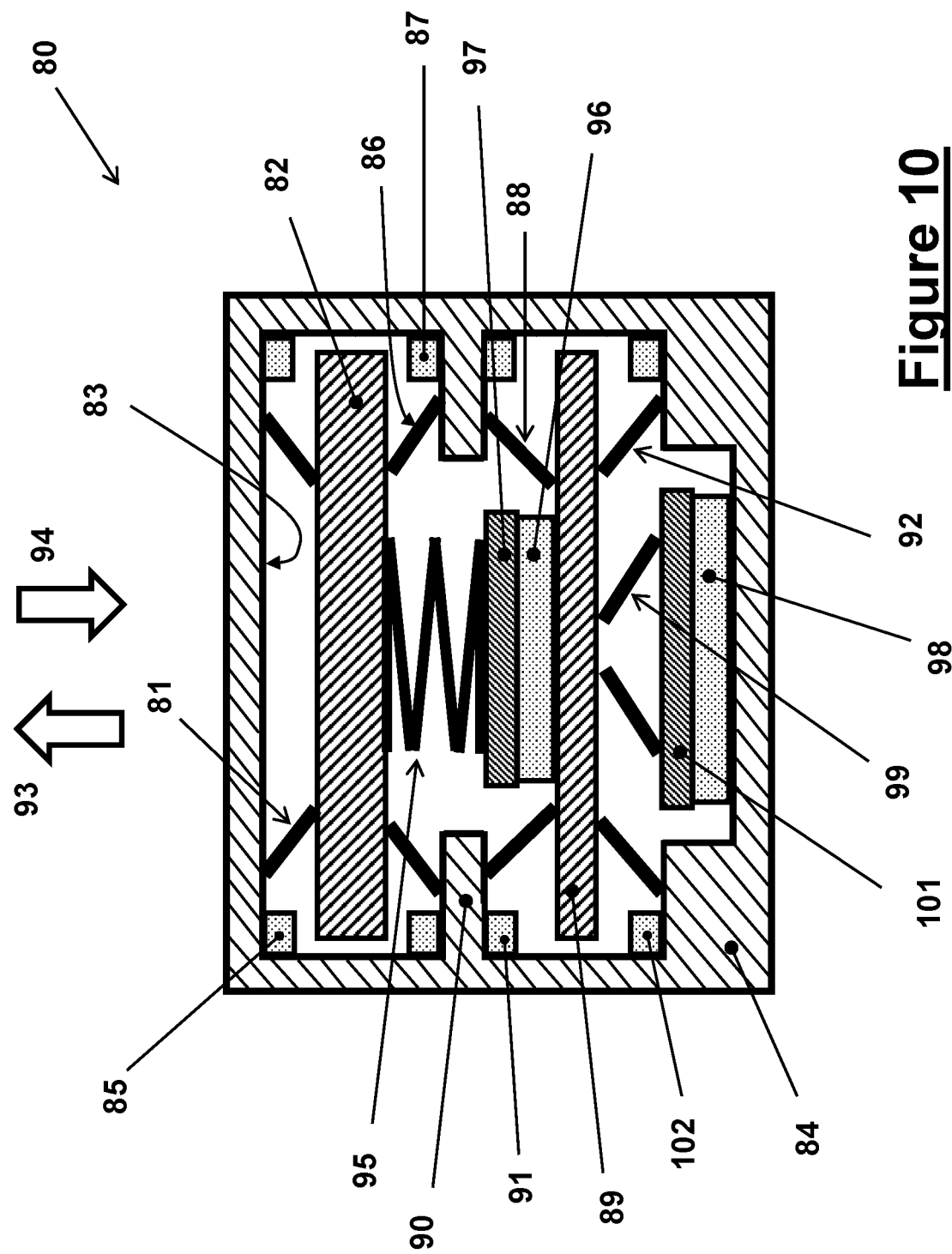
FIG. 10 illustrates the cross-sectional view of an alternative embodiment of the two-stage piezoelectric-based linear accelerometer of FIG. 2, configured for accurate measurement of a relatively large range of acceleration and deceleration.

The two-stage linear accelerometer embodiment 10 of FIG. 2 may also be similarly modified as was described for the accelerometer embodiment 60 of FIG. 7 to allow the accelerometer to measure both acceleration and deceleration. Such a modified two-stage accelerometer, indicated as the embodiment 80, is shown in the schematic of FIG. 10. All components of the accelerometer embodiment 80 are identical to those of the embodiment 10 of FIG. 2, except that it is provided with the additional compressively preloaded springs and seismic mass stops as described below.

The modified two-stage linear accelerometer 80 of FIG. 10 is provided additional compressively preloaded spring 81, which is positioned between the seismic mass 82 (20 in the embodiment of FIG. 2) and the top inner surface 83 of the housing 84 (11 in the embodiment of FIG. 2). The stop 85 is also provided to limit the upward motion of the seismic mass 82. When required depending on the level of acceleration and deceleration to be measured, a compressively preloaded spring 86 may also be provided as shown in FIG. 9. A stop 87 is also provided to limit downward motion of the seismic mass 82. An added compressively preloaded spring 88 is provided between the seismic mass 89 (14 in the embodiment of FIG. 2) and the step 90 (16 in the embodiment of FIG. 2). The stop 91 is also provided to limit the upward movement of the seismic mass 89. The compressively preloaded spring 92 (17 in the embodiment of FIG. 2) is also provided as shown in FIG. 10.

It will be appreciated by those skilled in the art that the accelerometer embodiment 80 of FIG. 10 can now measure acceleration in the direction of the arrow 93 as well as acceleration in the direction of the arrow 94 (i.e., deceleration of the object to which the accelerometer is attached). As the accelerometer 80 begins to be subjected to acceleration in the direction of the arrow 93, the inertia force due to the mass of the seismic mass 82 begins to apply a force to the compressively preloaded springs 86 and 95 (21 in the embodiment of FIG. 2). The net effect of the inertia force and the inertia forces due to the other moving parts of the accelerometer below and their spring preloading forces, will cause a net compressive deformation of the spring 95, which would in turn apply an increasing compressive force on the piezoelectric element 96 (19 in the embodiment of FIG. 2), via the thin and relatively rigid plate 97 (23 in the embodiment of FIG. 2). As the level of acceleration in the direction of the arrow 93 is increased, the net compressive force acting on the piezoelectric element 96 is increased until a predetermined acceleration level $A_1$ is reached, at which point the seismic mass 82 is stopped against the stop 87. It is appreciated that up to the threshold acceleration $A_1$, the piezoelectric element 98 of the accelerometer second stage is also subjected to increasing compressive force and would also generate an output as was described for the embodiment 10 of FIG. 2. However, the spring rates of the springs 88 and 92 are configured to be relatively high, thereby causing relative small deformation of the spring 99, thereby increasing the compressive loading of the piezoelectric element 98 by a relatively small amount. Then as the acceleration in the direction of the arrow 93 is increased beyond the threshold $A_1$, the inertia force due to the seismic mass 89 (in addition to the inertia forces due to the mass of the piezoelectric element 96, the thin plates 97 and 102, and springs 99, 95 and 88, which are considered to be relatively small) apply increasing compressive force to the piezoelectric element 98 via the thin and relatively rigid plate 101). The increasing acceleration in the direction of the arrow 93 is measured by the piezoelectric 98 until the seismic mass 89 is stopped against the stop 102.

The compressive forces applied to the piezoelectric elements 96 and 98 causes the piezoelectric elements to generate electrical charges, which charges are substantially proportional to the applied acceleration and that can be measured by the sensor electronics (not described) to measure the level of applied acceleration in the direction of the arrow 93. As was previously indicated, methods and electronics for measuring the voltage of charges generated in piezoelectric-based accelerometers (usually using a charge amplifier) is well known in the art.

When the accelerometer 80 is subjected to acceleration in the direction of the arrow 94, the larger inertia force due to the larger seismic mass 82 would first dominate and move the seismic mass upward, while the inertial force due to the mass of the seismic mass 89 will also force it upward. The net resulting inertia and spring forces acting on the compressively preloaded spring 95 causes it to extend, thereby causing the compressive force that it applies to the piezoelectric element 96 to be reduced. As the level of acceleration in the direction of the arrow 94 is increased, at some point the seismic mass 82 is stopped against the stop 85. From that point on, as the acceleration in the direction of the arrow 94 is increased, only the seismic mass 89 is left to generate an inertia force to allow it to move further upward, thereby further reducing the compressive force of the compressively preloaded spring 99 on the piezoelectric element 98. The accelerometer can measure acceleration in the direction of the arrow 94 up to the level at which the seismic mass 89 has been stopped by the stop 91.

It will be appreciated that the charges generated by the piezoelectric elements 96 and 98 have opposite polarity when the accelerometer 80 is subjected to acceleration in the direction of the arrow 93 or the arrow 94, which are in turn proportional in magnitude to the applied acceleration in the direction of the arrows.

It will also be appreciated by those skilled in the art that in response to acceleration in the direction of the arrow 93, the output of the piezoelectric element 96 of the first stage of the accelerometer 80 will have a relatively steep slope (i.e., the accelerometer will be very sensitive) until the seismic mass 82 is stopped against the stop 87. From this point on, acceleration in the direction of the arrow 93 is measured from the output of the piezoelectric element 98 (during which the compressive loading and therefore the output of the piezoelectric element 96 is generally decreasing). The slope of the latter output versus acceleration will be lower.

It will also be appreciated by those skilled in the art that the spring rates and compressive preloading levels of the accelerometer springs can be selected such that for the full ranges of accelerations in the directions of the arrows 93 and 94 the springs would never completely lose their compressive preloading.

It will also be appreciated by those skilled in the art that the two-stage accelerometer embodiment 80 of FIG. 10 may also be readily configured with more stages as was described for the embodiments 10 and 30 of FIGS. 2 and 4, respectively. In addition, the housings of the accelerometers may also be constructed as was described for the housing construction of FIG. 5.

The single-stage compressive type linear accelerometers for measuring accelerations above an acceleration threshold level described for the embodiment 45 of FIG. 6 may also be applied to shear type linear accelerometers, such as those similar to the prior art accelerometer of FIG. 1B. Such a single-stage linear accelerometer embodiment 110 for measuring acceleration above a prescribed acceleration threshold is shown in the schematic of FIG. 11.

Figure 11:
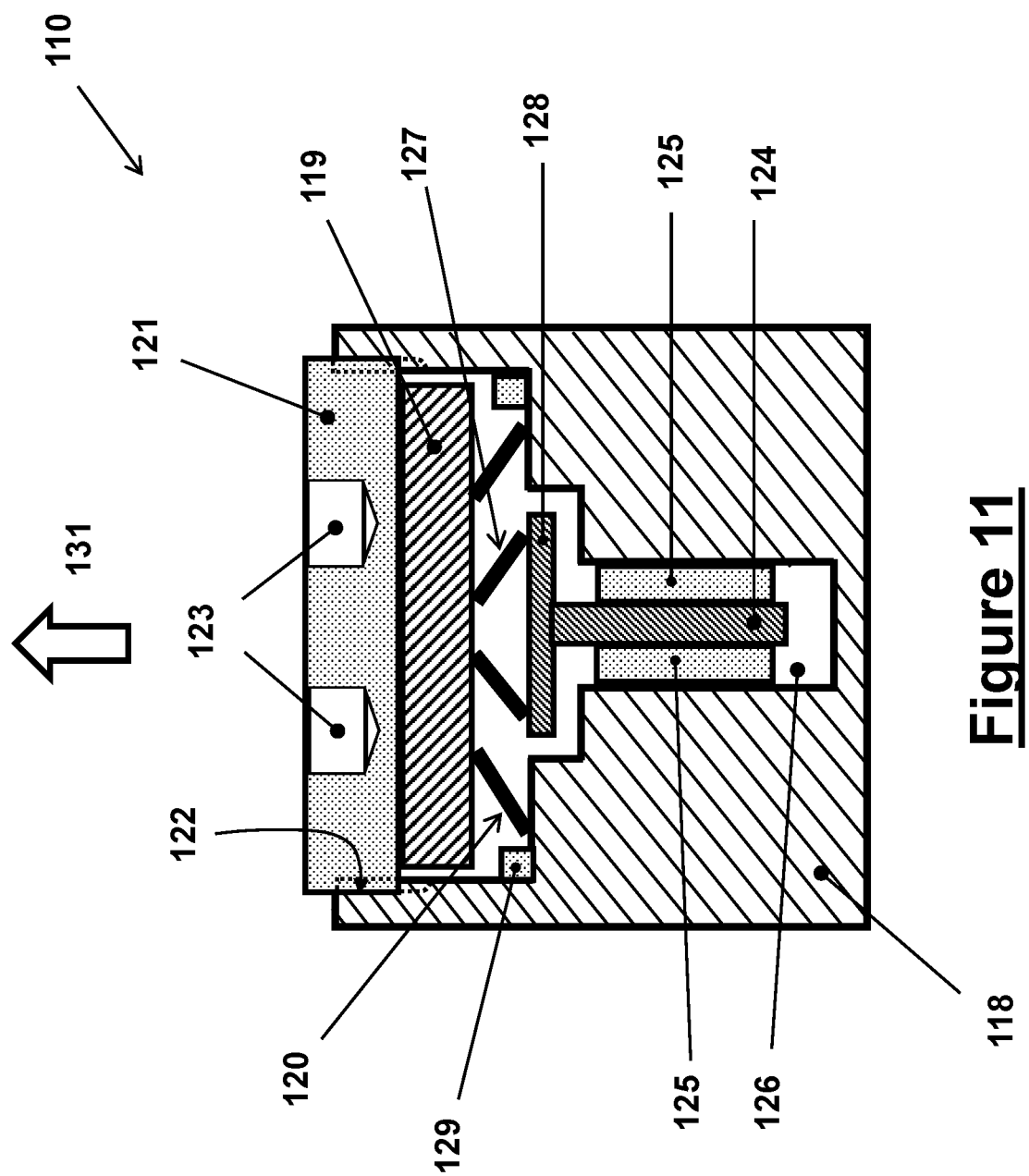
FIG. 11 illustrates the cross-sectional view of an embodiment of a single stage shear type piezoelectric-based linear accelerometer for measuring linear acceleration above a prescribed acceleration threshold.

The single-stage shear type linear accelerometer embodiment 110 of FIG. 11 can be seen to be constructed with a housing 118, within which a seismic mass 119 is assembled over a compressively preloaded spring 120. The threaded cap 121 is used to close the housing 118 as was described for the housing of FIG. 5, and to preload the compressive springs 120 to the desired level through the provided threads 122 on the top portion of the housing 118. The cap 121 is provided with properly spaced non-through holes 123 or other means well known in the art to engage a proper wrench for its tightening. A stop 129 is also provided for the seismic mass 119 to limit its downward travel. The stop 129 may be integral to the housing 118 or a separate ring that can be threaded or pressed in place or fixedly attached to the housing using well known adhesives. The linear accelerometer 110 is provided with a relatively rigid and lightweight (as compared to the seismic mass 119) member 124, which is sandwiched between pairs of piezoelectric elements 125 within the space 126 provided in the housing 118 as shown in FIG. 11. A slightly preloaded compressive spring 127 is provided to keep the seismic mass 119 in contact with the provided flat top portion 128 of the member 124.

In the embodiment 110 of FIG. 11, the member 124 is sandwiched between the two piezoelectric elements 125 and is snugly assembled in the space 126 of the housing 118. The process of assembly may include pressing the sandwiched members in place, or by shrinking, or using adhesives, or other manners. The piezoelectric elements 125 may be arranged with vertical and/or horizontal polarization directions, as was described for the prior art embodiment of FIG. 1B, whereby the same accelerometer can register motion in several directions perpendicular to one another. The piezoelectric leads are passed through provided holes (not shown) in the housing 118 to sensor electronics.

The single-stage shear type linear accelerometer 110 of FIG. 11 measures acceleration in the direction of the arrow 131 after an acceleration threshold $A_1$ determined by the level of compressive preloading of the spring 120 and the mass of the seismic mass 119 has been reached.

The single-stage shear type linear accelerometer 110 of FIG. 11 is suited for measuring linear in the direction of the arrow 131 since the piezoelectric elements 125 are mounted with their polarization directions parallel to the longitudinal axes of the accelerometer (vertical in the view of FIG. 11).

When the object to which the accelerometer 110 is attached begins to be accelerated in the direction of the arrow 131, as long as the level of the acceleration is below the aforementioned acceleration threshold $A_1$, the resulting inertia force due to the mass of the seismic mass 119 is countered by the compressive preloading of the compressive spring 120. Then when the level of acceleration rises above the acceleration threshold $A_1$, the inertia force due to the acceleration overcomes the preloading force of the compressively preloaded spring 120 and begin to deform the (generally lightly) compressively preloaded spring 127, thereby applying a force to the member 124 through its flat head 128, which would in turn apply a shearing strain to the piezoelectric elements 125 as was described for the prior art accelerometer embodiment of FIG. 1B. As a result, an electric charge proportional to the acceleration above the threshold level $A_1$ is generated (when polarization directions of the piezoelectric elements 125 are parallel to the longitudinal axes of the accelerometer 110). This charge can then be measured by means of the associated electric equipment, usually as a voltage. The stop 129 limits the maximum level of acceleration that the accelerometer 110 can measure in the direction of the arrow 131, and thereby also protects the piezoelectric elements 125 from failure due to overloading.

It will be appreciated that the inertia forces due to the mass of the member 124, the spring 127, and the effective mass of the piezoelectric elements themselves would also cause certain amount of shear strain in the piezoelectric elements and thereby electrical charges. However, by minimizing the size and weight of the elements, particularly the member 124, the total effective mass of the elements will be very small as compared to the mass of the seismic mass 119 and therefore the generated charges are generally negligible as compared to the charges that are generated due to the mass of the seismic mass 119. In addition, the amount of charges generated due to the mass of the 124, the spring 127, and the effective mass of the piezoelectric elements can be readily accounted for and compensated by the accelerometer electronics, particularly since all accelerometers are routinely calibrated before use. It will also be appreciated by those skilled in the art that the accelerometer 110 of FIG. 11 is also slightly sensitive to acceleration in the opposite direction of the arrow 131 (i.e., deceleration in the direction of the arrow 131), but is generally sensitive enough for such measurements due to the low level of the effective inertial of the mass of the 124, the spring 127, and the effective mass of the piezoelectric elements.

It will also be appreciated that as was previously indicated for the prior art shear type accelerometer embodiment of FIG. 1B, the shear type accelerometer of FIG. 11 with its polarization directions being parallel to the longitudinal axes of the accelerometer becomes less sensitive to temperature transients as compared to other types of accelerometers.

The single-stage shear type linear accelerometer 110 of FIG. 11 can be readily modified for accurate measurement of acceleration and deceleration above prescribed thresholds. Such a modified shear type accelerometer embodiment 130 is shown in the schematic of FIG. 12. As can be seen in the schematic of FIG. 12, the linear accelerometer embodiment 130 is obtained merging a "copy" of the "top portion" of the accelerometer 110 (including the top flat portion of the member 124), symmetrically, to the lower portion of the accelerometer. The resulting piezoelectric-based shear type linear accelerometer embodiment 130 is now capable of measuring acceleration in the direction of the arrow 132 above a prescribed acceleration threshold, and acceleration in the direction of the arrow 133 above a certain prescribed threshold. The level of the acceleration thresholds for the acceleration in the direction of the arrow 132 and 133, which may differ from each other, are determined by the level of the preloading of the compressive spring 134 and mass of the seismic mass 135, and the preloading of the compressive spring 136 and the mass of the seismic mass 137, respectively. The compressive preloading levels of the springs 134 and 136 are set and adjusted by the threaded caps 138 and 139, respectively, as was described for the embodiment 100 of FIG. 6A. The accelerometer may also be provided with the stops 143 and 144 for the seismic masses 135 and 137, respectively, to protect the piezoelectric elements 125.

It will be appreciated by those skilled in the art that similar to the linear accelerometer embodiment 100 of FIG. 6A, the acceleration thresholds above which acceleration in the direction of the arrows 132 and 132 are measured may be set at almost any level, including zero, i.e., the compressive springs 134 and 136 may even be eliminated. In which case, i.e., with the compressive springs 134 and 136 removed, the accelerometer can measure the full range of acceleration and deceleration of the object to which it is attached, i.e., acceleration in the direction of both arrows 132 and 133. It will also be appreciated that certain applications may require that only one of the two compressive springs 134 or 136 be removed. In all cases, the compressive springs 141 and 142 are still desired to be preloaded to certain level to ensure that their contact with their corresponding piezoelectric and seismic mass sides are not lost.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An accelerometer comprising:
a housing having an internal cavity;
a piezoelectric material disposed in the internal cavity;
a mass disposed in the internal cavity to be movable towards the piezoelectric material, the mass directly abutting on a surface of the housing, the surface opposing the mass in a direction of an acceleration of the housing; and
a spring disposed between the piezoelectric material and the mass to bias the mass away from the piezoelectric material in abutment against the surface of the housing such that the spring is compressively preloaded against the piezoelectric material;
wherein the mass is movable when the housing experiences the acceleration such that the mass acts upon the spring and the spring acts against the piezoelectric material, the piezoelectric material outputting a signal corresponding to a magnitude of the acceleration.

2. The accelerometer of claim 1, wherein the surface of the housing comprising a removable top portion, the spring being disposed between the piezoelectric material and the top portion of the housing.

3. The accelerometer of claim 2, wherein the removable top portion is movable to apply a predetermined compressive force to compressively preload the spring against the piezoelectric material.

4. The accelerometer of claim 1, wherein the spring is a Bellville type spring.

5. The accelerometer of claim 1, further comprising a stop for limiting a movement range of the mass in a direction opposite to the direction of the acceleration.

6. The accelerometer of claim 5, wherein the stop is a step formed on an interior surface of the housing.

7. The accelerometer of claim 1, wherein the spring is a first spring and the accelerometer further comprises a second spring disposed between the mass and an internal surface of the housing.

8. An accelerometer comprising:
a housing having first and second internal cavities;
a first piezoelectric material disposed in the first internal cavity;
a second piezoelectric material disposed in the second internal cavity;
a first mass disposed in the first internal cavity to be movable towards the first piezoelectric material, the first mass directly abutting on a first surface of the housing, the first surface opposing the mass in a first direction of a first acceleration of the housing;
a second mass disposed in the second internal cavity to be movable towards the second piezoelectric material, the second mass directly abutting on a second surface of the housing, the second surface opposing the second mass in a second direction of a second acceleration of the housing;
a first spring disposed between the first piezoelectric material and the first mass to bias the first mass away from the piezoelectric material in abutment against the first surface of the housing such that the first spring is compressively preloaded against the first piezoelectric material; and
a second spring disposed between the second piezoelectric material and the second mass to bias the second mass away from the piezoelectric material in abutment against the second surface of the housing such that the second spring is compressively preloaded against the second piezoelectric material;
wherein the first mass is movable when the housing experiences the first acceleration in the first direction such that the first mass acts upon the first spring and the first spring acts against the first piezoelectric material, the first piezoelectric material outputting a first signal corresponding to a magnitude of the first acceleration; and
the second mass is movable when the housing experiences the second acceleration in the second direction such that the second mass acts upon the second spring and the second spring acts against the second piezoelectric material, the second piezoelectric material outputting a second signal corresponding to a magnitude of the second acceleration, the first acceleration being in a direction different from a direction of the second acceleration.

9. The accelerometer of claim 8, wherein the first surface of the housing is comprised by a first removable top portion, the first spring being disposed between the first piezoelectric material and the first removable top portion of the housing.

10. The accelerometer of claim 9, wherein the first removable top portion is movable to apply a predetermined compressive force to compressively preload the first spring against the first piezoelectric material.

11. The accelerometer of claim 8, wherein the first spring is a Bellville type spring.

12. The accelerometer of claim 8, further comprising a stop for limiting a movement range of the first mass in a direction opposite to the direction of the first acceleration.

13. The accelerometer of claim 12, wherein the stop is a step formed on an interior surface of the housing.

14. The accelerometer of claim 8, further comprising a third spring disposed between the first mass and an internal surface of the housing.

15. The accelerometer of claim 8, wherein the second surface of the housing is comprised by a second removable top portion, the second spring being disposed between the second piezoelectric material and the second removable top portion of the housing.

16. The accelerometer of claim 15, wherein the second removable top portion is movable to apply a predetermined compressive force to compressively preload the second spring against the second piezoelectric material.

17. The accelerometer of claim 8, wherein the second spring is a Bellville type spring.

18. The accelerometer of claim 8, further comprising a stop for limiting a movement range of the second mass in a direction opposite to the direction of the second acceleration.

19. The accelerometer of claim 18, wherein the stop is a step formed on an interior surface of the housing.

20. The accelerometer of claim 8, further comprising a third spring disposed between the second mass and an internal surface of the housing.

* * * * *